(12) United States Patent
Yoshikawa et al.

(10) Patent No.: US 8,120,998 B2
(45) Date of Patent: Feb. 21, 2012

(54) OPTICAL DISK DRIVE AND METHOD FOR DRIVING THE OPTICAL DISK DRIVE IN RELATION TO A VELOCITY SWITCHING POINT

(75) Inventors: Akira Yoshikawa, Nara (JP); Kenji Kondo, Osaka (JP)

(73) Assignee: Panasonic Corporation, Osaka (JP)

( * ) Notice: Subject to any disclaimer, the term of this patent is extended or adjusted under 35 U.S.C. 154(b) by 792 days.

(21) Appl. No.: 11/460,713

(22) Filed: Jul. 28, 2006

(65) Prior Publication Data
US 2007/0025220 A1 Feb. 1, 2007

(30) Foreign Application Priority Data

Aug. 1, 2005 (JP) .................................. 2005-223178

(51) Int. Cl.
*G11B 7/00* (2006.01)
(52) U.S. Cl. ..................................................... 369/44.27
(58) Field of Classification Search ........................ None
See application file for complete search history.

(56) References Cited

U.S. PATENT DOCUMENTS

| 5,060,215 | A | | 10/1991 | Kawamura et al. |
| 5,859,824 | A | * | 1/1999 | Izumi et al. .................. 369/44.29 |
| 6,154,425 | A | | 11/2000 | Iida et al. |
| 6,252,834 | B1 | | 6/2001 | Kumagai |
| 6,370,093 | B1 | | 4/2002 | Tada et al. |
| 6,584,048 | B1 | | 6/2003 | Tateishi et al. |
| 6,603,717 | B1 | | 8/2003 | Kawada et al. |
| 7,046,594 | B2 | * | 5/2006 | Wu ............................. 369/44.36 |
| 7,099,253 | B2 | * | 8/2006 | Hsu et al. .................... 369/53.23 |
| 7,242,645 | B2 | * | 7/2007 | Takahashi et al. .......... 369/44.29 |
| 7,248,542 | B2 | * | 7/2007 | Nakano ....................... 369/44.27 |
| 7,276,680 | B2 | * | 10/2007 | Yoshikawa et al. .......... 250/201.5 |
| 2002/0044224 | A1 | * | 4/2002 | Terai et al. .................... 348/571 |

(Continued)

FOREIGN PATENT DOCUMENTS
EP 1 460 617 3/2004
(Continued)

OTHER PUBLICATIONS

European Search Report for corresponding Application No. 06118191.3 dated Nov. 22, 2007.

(Continued)

*Primary Examiner* — Hoa T Nguyen
*Assistant Examiner* — Mark Fischer
(74) *Attorney, Agent, or Firm* — Renner, Otto, Boisselle & Sklar, LLP

(57) ABSTRACT

An optical disk drive includes: an objective lens for converging a light beam onto an optical disk with an information storage layer; an actuator for moving the lens perpendicularly to the storage layer; an actuator driver for moving the lens at a predetermined velocity by controlling the actuator's operation; and a disk position detector for detecting the position of the lens, when the focal point of the beam is located on the storage layer, as a disk position. While the lens is being moved toward the disk to perform a focus finding operation, the moving velocity of the lens is set high until the lens reaches a velocity switching point, determined by reference to the disk position, and is set low once the lens has passed the point. The switching point is set farther away from the disk than the position of the lens is when the focal point of the beam is located on the storage layer of the disk.

20 Claims, 12 Drawing Sheets

U.S. PATENT DOCUMENTS

| | | | |
|---|---|---|---|
| 2003/0067850 A1* | 4/2003 | Takahashi et al. | 369/44.29 |
| 2003/0076755 A1* | 4/2003 | Chiang et al. | 369/44.27 |
| 2004/0076090 A1 | 4/2004 | Ishibashi et al. | |
| 2004/0213102 A1* | 10/2004 | Yamada et al. | 369/44.37 |
| 2005/0007901 A1 | 1/2005 | Takaba | |
| 2005/0254360 A1* | 11/2005 | Sameshima et al. | 369/44.23 |
| 2006/0198257 A1* | 9/2006 | Kobayashi | 369/44.27 |
| 2007/0195668 A1* | 8/2007 | Raaymakers et al. | 369/53.2 |
| 2007/0206468 A1* | 9/2007 | Takahashi et al. | 369/53.2 |
| 2008/0019224 A1* | 1/2008 | Ishibashi | 369/30.03 |

FOREIGN PATENT DOCUMENTS

| | | |
|---|---|---|
| EP | 1 701 342 | 9/2006 |
| JP | 62-239327 | 10/1987 |
| JP | 63-177320 | 7/1988 |
| JP | 02-076128 | 3/1990 |
| JP | 02-162531 | 6/1990 |
| JP | 09-027129 A | 1/1997 |
| JP | 10-055546 | 2/1998 |
| JP | 10-268180 | 10/1998 |
| JP | 11007633 A * | 1/1999 |
| JP | 11-120570 | 4/1999 |
| JP | 11-353657 | 12/1999 |
| JP | 2003-208720 | 7/2003 |
| JP | 2005-25813 | 1/2005 |
| WO | 2005/055213 | 6/2005 |
| WO | WO 2005104119 A1 * | 11/2005 |
| WO | WO 2006030818 A1 * | 3/2006 |

OTHER PUBLICATIONS

Notice of Reasons for Rejection for corresponding Japanese Application No. 2006-199359 dated Jan. 22, 2008 (English translation provided).

European Search Report regarding Application No. 06118191.3 dated Aug. 16, 2007.

Notice of Reasons for Rejection for corresponding Japanese Application No. 2008-056673 dated Mar. 8, 2011 (English translation provided).

* cited by examiner

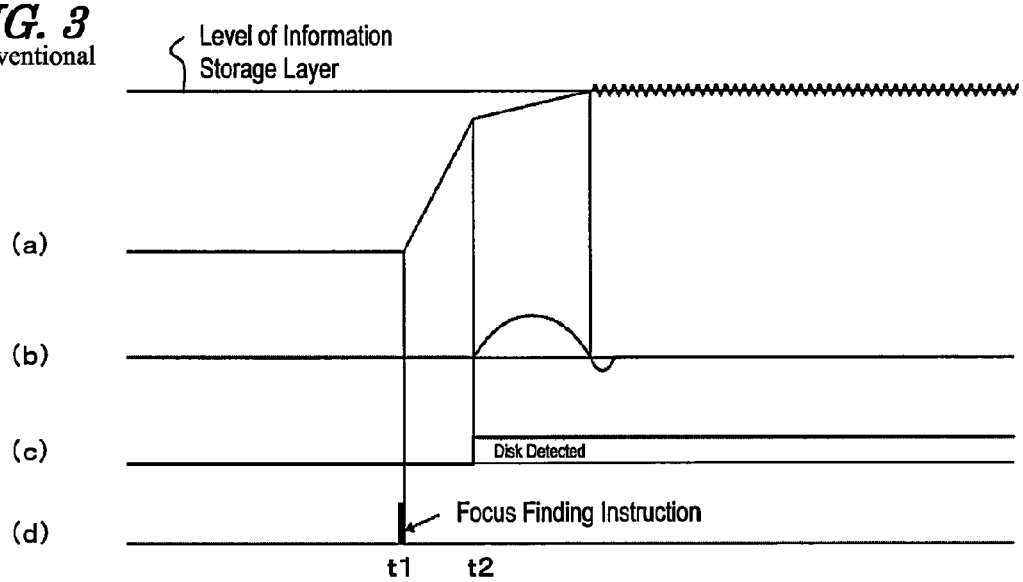
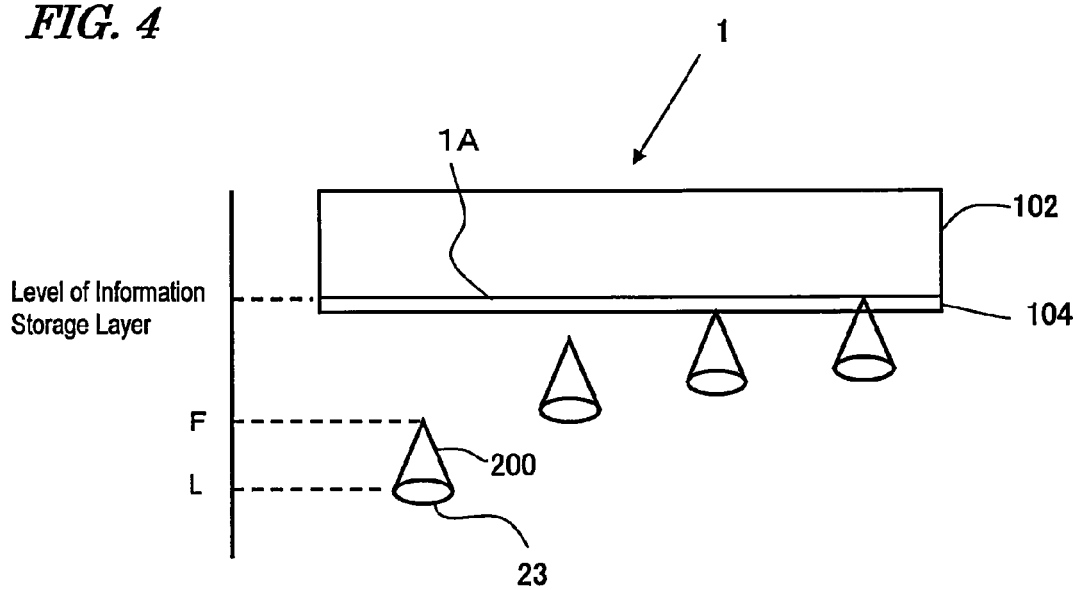

OPTICAL DISK DRIVE AND METHOD FOR DRIVING THE OPTICAL DISK DRIVE IN RELATION TO A VELOCITY SWITCHING POINT

BACKGROUND OF THE INVENTION

1. Field of the Invention

The present invention relates to an optical disk drive for reading and/or writing data from/on an optical disk as a storage medium using a light beam, and more particularly relates to the focus control of the light beam.

2. Description of the Related Art

In optical disk technologies, data can be read out from a rotating optical disk by irradiating the disk with a relatively weak light beam with a constant intensity, and detecting the light that has been modulated by, and reflected from, the optical disk.

On a read-only optical disk, information is already stored as pits that are arranged spirally during the manufacturing process of the optical disk. On the other hand, on a rewritable optical disk, a recording material film, from/on which data can be read and written optically, is deposited by an evaporation process, for example, on the surface of a substrate on which tracks with spiral lands or grooves are arranged. In writing data on such a rewritable optical disk, data is written there by irradiating the optical disk with a light beam, of which the optical power has been changed according to the data to be written, and locally changing the property of the recording material film.

It should be noted that the depth of the pits, the depth of the tracks, and the thickness of the recording material film are all smaller than the thickness of the optical disk substrate. For that reason, those portions of the optical disk, where data is stored, define a two-dimensional plane, which is sometimes called an "information storage plane". However, considering that such an "information storage plane" has a physical dimension in the depth direction, too, the term "information storage plane" will be replaced herein by another term "information storage layer". Every optical disk has at least one such information storage layer. Optionally, a single information storage layer may actually include a plurality of layers such as a phase-change material layer and a reflective layer.

To write data on a recordable optical disk or to read data that is stored on such a disk, the light beam always needs to maintain a predetermined converging state on a target track on an information storage layer. For that purpose, a "focus control" and a "tracking control" are required. The "focus control" means controlling the position of an objective lens perpendicularly to the information storage layer such that the focus position (or converging point) of the light beam is always located on the information storage layer. On the other hand, the "tracking control" means controlling the position of the objective lens along the radius of a given optical disk such that the light beam spot is always located right on a target track.

Various types of optical disks such as DVD-ROM, DVD-RAM, DVD-RW, DVD-R, DVD+RW and DVD+R have become more and more popular these days as storage media on which a huge amount of information can be stored at a high density. Optical disk drives compatible with those optical disks use an optical lens (i.e., an objective lens) with a numerical aperture (NA) of 0.6. Recently, however, in order to further increase the maximum densities and capacities of the optical disks, next-generation optical disks, including Blu-ray Disc (BD), have been under research and development and have already been put on the market. They suggest that an optical lens with an NA of at least 0.8 be used for such next-generation optical disks.

FIG. 1 schematically illustrates how an optical disk 1 is irradiated with a light beam 200 that has been converged by an objective lens 23. The optical disk 1 is rotating at a high velocity during a read/write operation. Therefore, to perform a high-precision focus control on the rotating optical disk 1, the degree of convergence of the light beam 200 on the information storage layer needs to be detected, while at the same time, the focus position needs to be adjusted such that the focal point of the light beam 200 is always on the information storage layer. Such focus position adjustment may be done by moving the objective lens 23 back and forth along its optical axis.

Actually, the surface of an optical disk 1 is not perfectly flat but is normally slightly warped. That is why the portion of the optical disk 1 being irradiated with the light beam 200 vibrates up and down at a high velocity, albeit slightly (e.g., on the order of several hundreds of micrometers), as the optical disk 1 turns. For that reason, if the objective lens 23 for converging the light beam 200 were fixed at the same position, then the light beam 200 would be sometimes out of focus with the information storage layer of the optical disk 1. Such a vertical vibration (i.e., the out-of-plane vibration) of the irradiated portion of the rotating optical disk 1 will be referred to herein as the "disk flutter" of the optical disk and its magnitude as the "amplitude of disk flutter". The maximum allowable amplitude of the disk flutter of an optical disk is defined by optical disk standard specifications.

To always keep the focal point of the light beam 200 located right on the information storage layer of the optical disk 1 even with such disk flutter, the position of the objective lens 23 (i.e., its position in the axial direction) needs to be controlled in quick response to a focus error signal representing the magnitude of positional shift of the focal point of the light beam 200 from the information storage layer of the optical disk 1. Hereinafter, the basic operation of focus control will be described.

FIG. 2 is a graph showing the curve of a focus error signal. In FIG. 2, the ordinate represents the amplitude of the focus error signal and the abscissa represents the focus position of the light beam. If there is a good distance from the focus position of the light beam to the information storage layer of the optical disk, then the focus error signal has zero amplitude. However, as the focus position of the light beam approaches the information storage layer of the optical disk, the amplitude of the focus error signal has non-zero values in a certain range, thereby making an S-curve there. In FIG. 2, the range of the S-curve (i.e., the upper and lower limits thereof) is pointed by the arrows.

When a focus servo control is activated and its control loop is closed, the position of the objective lens 23 gets finely adjusted so as to make the focus error signal as close to zero as possible. However, even when there is a long distance from the focus position of the light beam to the information storage layer of the optical disk 1, the focus error signal also has zero amplitude. That is why before the focus servo control is activated, the focus position of the light beam needs to be brought close to the information storage layer of the optical disk to the point that the focus error signal shows the S-curve. That is to say, to activate the focus servo control, the focal point of the light beam needs to be brought sufficiently close to the information storage layer of the optical disk and the S-curve of the focus error signal needs to be detected by moving the objective lens 23 along its optical axis first. After the S-curve of the focus error signal has been detected in this manner, the focus servo control is activated at a good timing, thereby getting a focus control started. Such an operation of looking for the position where the focus error signal shows the S-curve by changing the positions of the objective lens 23 along its optical axis and then activating the focus servo control on detecting the S-curve will be referred to herein as a "focus finding operation".

To get the focus finding operation done in a short time, the objective lens 23 should be moved at a high velocity along the optical axis. However, the objective lens 23 also has mass. That is why if the objective lens 23 has been moved quickly until the focus error signal shows the S-curve, the objective lens 23 cannot be stopped the instant the S-curve is detected. If the moving velocity of the objective lens 23 is high, then the focal point of the light beam may pass the information storage layer of the optical disk 1 and reach a range where the focus error signal shows no S-curve (i.e., the range where the focus error signal is zero). In that case, even if the focus servo control is carried out, the focal point of the light beam cannot keep up with the information storage layer. Since this is a state in which the focus servo has failed, the focus finding operation needs to be retried.

To avoid such a failure of the focus finding operation, the moving velocity of the objective lens 23 could be decreased. In that case, however, it would take too much time to get the focus finding operation done. In view of these considerations, to shorten the time it takes to get the focus finding operation done, it was proposed that the moving velocities of the objective lens be changed in two stages (see Patent Document No. 1).

Hereinafter, a conventional technique of getting the focus finding operation done more quickly will be described with reference to FIG. 3, which is a waveform chart showing how the focus finding operation is carried out in a conventional optical disk drive.

Portion (a) of FIG. 3 shows the focus positions of a light beam during the focus finding operation. In portion (a) of FIG. 3, the abscissa represents the time, thereby showing where the focal point of the light beam passes with time until the focal point reaches the information storage layer of the optical disk. Portion (b) of FIG. 3 shows a focus error signal.

In the example shown in FIG. 3, the focal point of the light beam is relatively far away (e.g., at a retracted position) from the information storage layer of the optical disk up to a time t1, when the focal point starts to move quickly toward the information storage layer. This is because a focus finding instruction is output at the time t1 as shown in portion (d) of FIG. 3 and the actuator starts moving the objective lens toward the optical disk 1 at a high velocity in response to this instruction.

As the objective lens is getting closer to the optical disk, the focal point of the light beam is also getting closer and closer to the information storage layer. And when the focal point of the light beam is sufficiently close to the information storage layer, a portion of the light beam is reflected by the optical disk. By detecting this reflected light, a read signal (such as an RF signal) and a focus error signal can be generated. When the intensity of the reflected light (as represented by the RF signal) becomes at least equivalent to the reference voltage at a time t2, the optical disk detection signal rises to High level as shown in portion (c) of FIG. 3. In this optical disk drive, when the level of the optical disk detection signal rises, the moving velocity of the objective lens decreases as shown in portion (a) of FIG. 3.

When the focal point of the light beam reaches the information storage layer of the optical disk as shown in portion (a) of FIG. 3, a zero cross point is detected in the S-curve of the focus error signal as shown in portion (b) of FIG. 3. At the time when this zero cross point is detected, the focus servo control loop is closed and the focus finding operation is completed. Once the focus finding operation has been done, the position of the objective lens is always controlled such that the focus error signal becomes as close to zero as possible. That is why even if the information storage layer of the optical disk waves vertically to a certain degree, the focal point of the light beam can still keep up with the information storage layer.

According to the conventional technique described above, the objective lens is moved toward the optical disk quickly until the optical disk is detected by the reflected light and then moved more slowly once the presence of the optical disk has been sensed, thereby trying to get the focus finding operation done more accurately but more quickly.

Patent Document No. 1: Japanese Patent Application Laid-Open Publication No. 2-76128 (see FIG. 2)

DISCLOSURE OF INVENTION

Problems to be Solved by the Invention

The optical disk drive described above senses, by the intensity of the reflected light, that the objective lens has come sufficiently close to the optical disk. However, there may be just a short interval between the time when the intensity of the reflected light reaches a detectible level and the zero cross point of the focus error signal. In that case, before the moving velocity of the objective lens is decreased sufficiently, the focal point of the light beam may pass the information storage layer. As a result, the focus finding operation sometimes cannot be carried out with good stability.

If the numerical aperture (NA) of the optical system of an optical disk drive were increased to realize high-density recording, then the focal length and depth of focus of the objective lens would decrease. Thus, the variation in the intensity of the reflected light could not be sensed unless the objective lens was brought sufficiently close to the optical disk. In that case, if the objective lens were not decelerated until the presence of the optical disk is detected, then the deceleration might be too late to get the focus finding operation done successfully. Nevertheless, if the moving velocity of the objective lens were set low from the beginning to avoid such a failure, then the effect of quick focus finding would be lost.

In order to overcome the problems described above, a primary object of the present invention is to provide an optical disk drive that can get a focus finding operation done in a shorter time and with good stability even if the NA of the optical system is increased.

SUMMARY OF THE INVENTION

An optical disk drive according to the present invention includes: an objective lens for converging a light beam onto an optical disk that includes an information storage layer; an actuator for moving the objective lens perpendicularly to the information storage layer of the optical disk; an actuator driving section for moving the objective lens at a predetermined velocity by controlling the operation of the actuator; disk position detecting means for detecting a position of the objective lens, when the focal point of the light beam is located right on the information storage layer of the optical disk, as a disk position; and moving velocity setting means for setting the moving velocity of the objective lens to a relatively high value until the objective lens reaches a velocity switching point, which is determined by reference to the disk position, while the objective lens is being moved toward the optical disk to carry out a focus finding operation and for setting the moving velocity of the objective lens to a relatively low value once the objective lens has passed the velocity switching point. Before the focus finding operation is started, the disk position detecting means gets the objective lens moved perpendicularly to the information storage layer of the optical disk by the actuator, thereby setting the disk position. And the velocity switching point is set farther away from the optical disk than the position of the objective lens is when the focal point of the light beam is located on the information storage layer of the optical disk.

In one preferred embodiment, the distance from the position of the objective lens when the focal point of the light beam is located on the information storage layer of the optical disk to the velocity switching point is determined by the amplitude of disk flutter of the optical disk.

In this particular preferred embodiment, the amplitude of the disk flutter of the optical disk is defined by a standard for the optical disk.

In another preferred embodiment, the moving velocity setting means includes: a drive signal generator for generating a drive signal to drive the actuator; and velocity switching point detecting means for giving the drive signal generator an instruction to change the moving velocities when sensing that the objective lens is located at the velocity switching point.

In that case, the optical disk drive preferably further includes: focus error detecting means for generating a focus error signal representing the magnitude of shift of the focal point of the light beam from the information storage layer of the optical disk; and in-focus state detecting means for seeing, by reference to the focus error signal, if the focal point of the light beam is located right on the information storage layer of the optical disk. Based on the drive signal to drive the actuator and on the output of the in-focus state detecting means, the disk position detecting means defines a value of the drive signal, which is associated with the disk position, as disk position information.

In a specific preferred embodiment, while the objective lens is being moved toward the optical disk to carry out the focus finding operation, the velocity switching point detecting means senses, by reference to the drive signal to drive the actuator and the disk position information, if the objective lens has reached the velocity switching point.

In yet another preferred embodiment, the optical disk drive further includes disk type recognizing means for recognizing the type of the optical disk. The type of the disk is recognized by getting the objective lens moved by the actuator perpendicularly to the information storage layer of the optical disk, while the disk position detecting means sets the disk position.

In this particular preferred embodiment, based on the result of type recognition done by the disk type recognizing means, the moving velocity setting means determines the distance from the velocity switching point to the disk position.

In yet another preferred embodiment, the disk position is set a number of times with the optical disk rotated. A position of the objective lens, which is farther away from the optical disk than any other position of the objective lens when the focal point of the light beam is located on the information storage layer of the optical disk, is selected as the disk position.

In yet another preferred embodiment, the optical disk drive further includes reflected light intensity detecting means for outputting a reflected light intensity signal representing the intensity of light that has been reflected from the optical disk. By reference to the focus error signal and the reflected light intensity signal, the in-focus state detecting means senses if the focal point of the light beam is located on the information storage layer of the optical disk.

In yet another preferred embodiment, the optical disk drive further includes a memory for storing information about the disk position or the velocity switching point.

A processor according to the present invention is used in an optical disk drive that includes: an objective lens for converging a light beam onto an optical disk that includes an information storage layer; an actuator for moving the objective lens perpendicularly to the information storage layer of the optical disk; and an actuator driving section for moving the objective lens at a predetermined velocity by controlling the operation of the actuator. The processor includes: disk position detecting means for detecting a position of the objective lens, when the focal point of the light beam is located right on the information storage layer of the optical disk, as a disk position; and moving velocity setting means for setting the moving velocity of the objective lens to a relatively high value until the objective lens reaches a velocity switching point, which is determined by reference to the disk position, while the objective lens is being moved toward the optical disk to carry out a focus finding operation and for setting the moving velocity of the objective lens to a relatively low value once the objective lens has passed the velocity switching point. Before the focus finding operation is started, the disk position detecting means gets the objective lens moved perpendicularly to the information storage layer of the optical disk by the actuator, thereby setting the disk position. And the velocity switching point is set farther away from the optical disk than the position of the objective lens is when the focal point of the light beam is located on the information storage layer of the optical disk.

An optical disk drive driving method according to the present invention is a method for driving an optical disk drive that includes: converging and irradiating means for converging a light beam onto an optical disk, including an information storage layer, through an objective lens and irradiating the disk with the light beam; an actuator for moving the objective lens perpendicularly to the information storage layer of the optical disk; and an actuator driving section for moving the objective lens at a predetermined velocity by controlling the operation of the actuator. The method includes the steps of: (A) detecting a position of the objective lens, when the focal point of the light beam is located right on the information storage layer of the optical disk, as a disk position; (B) setting a velocity switching point, where the moving velocities of the objective lens are changed, farther away from the optical disk than the position of the objective lens is when the focal point of the light beam is located on the information storage layer of the optical disk; and (C) moving the objective lens toward the optical disk to carry out a focus finding operation. The step (C) includes setting the moving velocity of the objective lens to a relatively high value until the objective lens reaches the velocity switching point and setting the moving velocity of the objective lens to a relatively low value once the objective lens has passed the velocity switching point.

Another optical disk drive according to the present invention includes: an objective lens for converging a light beam onto an optical disk that includes an information storage layer; an actuator for moving the objective lens perpendicularly to the information storage layer of the optical disk; an actuator driving section for moving the objective lens at a predetermined velocity by controlling the operation of the actuator; disk position detecting means for detecting a position of the objective lens, when the focal point of the light beam is located right on the information storage layer of the optical disk, as a disk position; and moving velocity setting means for setting the moving velocity of the objective lens to a relatively high value until the objective lens reaches a velocity switching point, which is determined by reference to the disk position, while the objective lens is being moved toward the optical disk to carry out a focus finding operation and for setting the moving velocity of the objective lens to a relatively low value once the objective lens has passed the velocity switching point. The velocity switching point is set farther away from the optical disk than the position of the objective lens is when the focal point of the light beam is located on the information storage layer of the optical disk. And when the focus finding operation is started over after the light beam has once been out of focus with the optical disk, the moving velocity setting means changes the moving velocities of the objective lens at the velocity switching point that has been set by reference to the disk position detected.

In one preferred embodiment, the disk position detecting means sets the velocity switching point for the next focus finding operation by reference to the position of the objective lens when the focal point of the light beam is located on the information storage layer of the optical disk and before the light beam comes out of focus with the optical disk.

In this particular preferred embodiment, the optical disk drive further includes: focus error detecting means for generating a focus error signal representing the magnitude of shift of the focal point of the light beam from the information storage layer of the optical disk; and in-focus state detecting means for seeing, by reference to the focus error signal, if the focal point of the light beam is located right on the information storage layer of the optical disk. Based on the drive signal to drive the actuator and on the output of the in-focus state detecting means, the disk position detecting means defines a value of the drive signal, which is associated with the disk position, as disk position information.

In a specific preferred embodiment, the optical disk drive further includes a low pass filter for filtering out high frequency components from the drive signal. Based on the drive signal, of which the high frequency components have been filtered out, and the output of the in-focus state detecting means, the disk position detecting means defines disk position information.

More specifically, the velocity switching point when the focus finding operation is started over is closer to the optical disk than the velocity switching point was when the focus finding operation was performed for the first time.

In yet another preferred embodiment, before the focus finding operation is started for the first time, the disk position detecting means gets the objective lens moved perpendicularly to the information storage layer of the optical disk by the actuator, thereby setting the disk position.

Still another optical disk drive according to the present invention includes: an objective lens unit for converging a first light beam with a first wavelength onto a first information storage layer of an optical disk, which includes a plurality of information storage layers including the first information storage layer and a second information storage layer, and for converging a second light beam with a second wavelength onto the second information storage layer; an actuator for moving the objective lens unit perpendicularly to the information storage layers of the optical disk; an actuator driving section for moving the objective lens unit at a predetermined velocity by controlling the operation of the actuator; disk position detecting means for detecting a position of the objective lens unit, when the focal point of the first light beam is located right on the first information storage layer of the optical disk, as a disk position; and moving velocity setting means for setting the moving velocity of the objective lens unit to a relatively high value until the objective lens unit reaches a velocity switching point, which is determined by reference to the disk position, while the objective lens unit is being moved toward the optical disk to carry out a focus finding operation on the second information storage layer using the second light beam and for setting the moving velocity of the objective lens unit to a relatively low value once the objective lens unit has passed the velocity switching point. The velocity switching point is set farther away from the optical disk than the position of the objective lens unit is when the focal point of the second light beam is located on the second information storage layer of the optical disk.

In one preferred embodiment, before the focus finding operation is performed on the first information storage layer using the first light beam, the disk position detecting means gets the objective lens unit moved perpendicularly to the first information storage layer by the actuator, thereby setting the disk position.

In this particular preferred embodiment, the moving velocity setting means sets a velocity switching point for the focus finding operation to be performed on the second information storage layer using the second light beam by reference to the position of the objective lens unit when the focal point of the first light beam is located on the first information storage layer of the optical disk.

According to the present invention, the point where the moving velocities of an objective lens are switched (which will be referred to herein as a "velocity switching point") is defined by reference to "disk position information" that shows the position of the objective lens when the focal point of a light beam is located right on the information storage layer of an optical disk. This velocity switching point is set farther away from the optical disk (i.e., behind the objective lens) than the position of the objective lens is when the focal point of the light beam is located on the information storage layer of the optical disk. That is why even if the objective lens is moved to the "velocity switching point" quickly, the objective lens can still be decelerated sufficiently before the focal point reaches the information storage layer. As a result, the focus finding operation can be done with good stability.

In an optical disk drive that performs a disk type recognizing operation, the objective lens is moved during the disk type recognizing operation. Thus, the "disk position information" can be collected during the disk type recognizing operation. In that case, there is no need to perform the operation of getting the disk position information specially for that purpose.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 3 shows how a conventional optical disk drive operates, wherein: portion (a) shows how the focus positions of a light beam change with time; portion (b) shows a focus error signal; portion (c) shows an optical disk detection signal; and portion (d) shows a focus finding instruction.

FIG. 4 shows how lens positions L and focus positions F change with respect to an information storage layer R.

Figure 6:
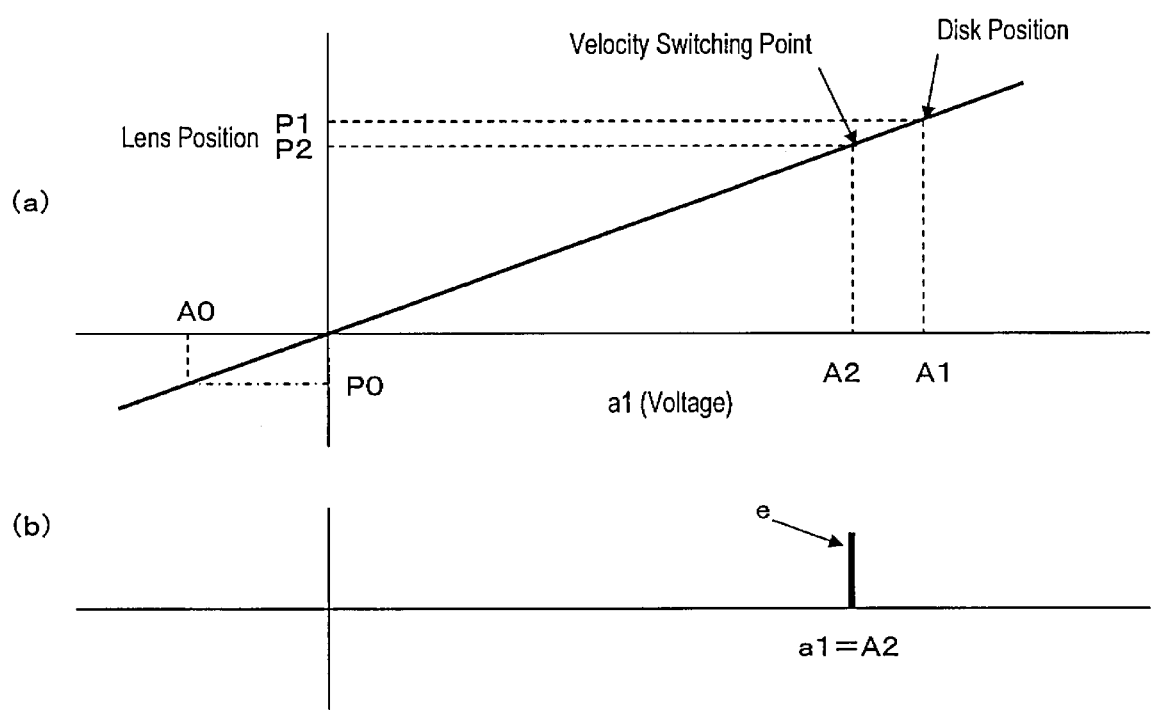

Portion (a) of FIG. 6 shows how the level of a ramp signal changes with the lens position in a preferred embodiment of the present invention, while portion (b) of FIG. 6 shows the output timing of a velocity switching signal e.

Figure 7:
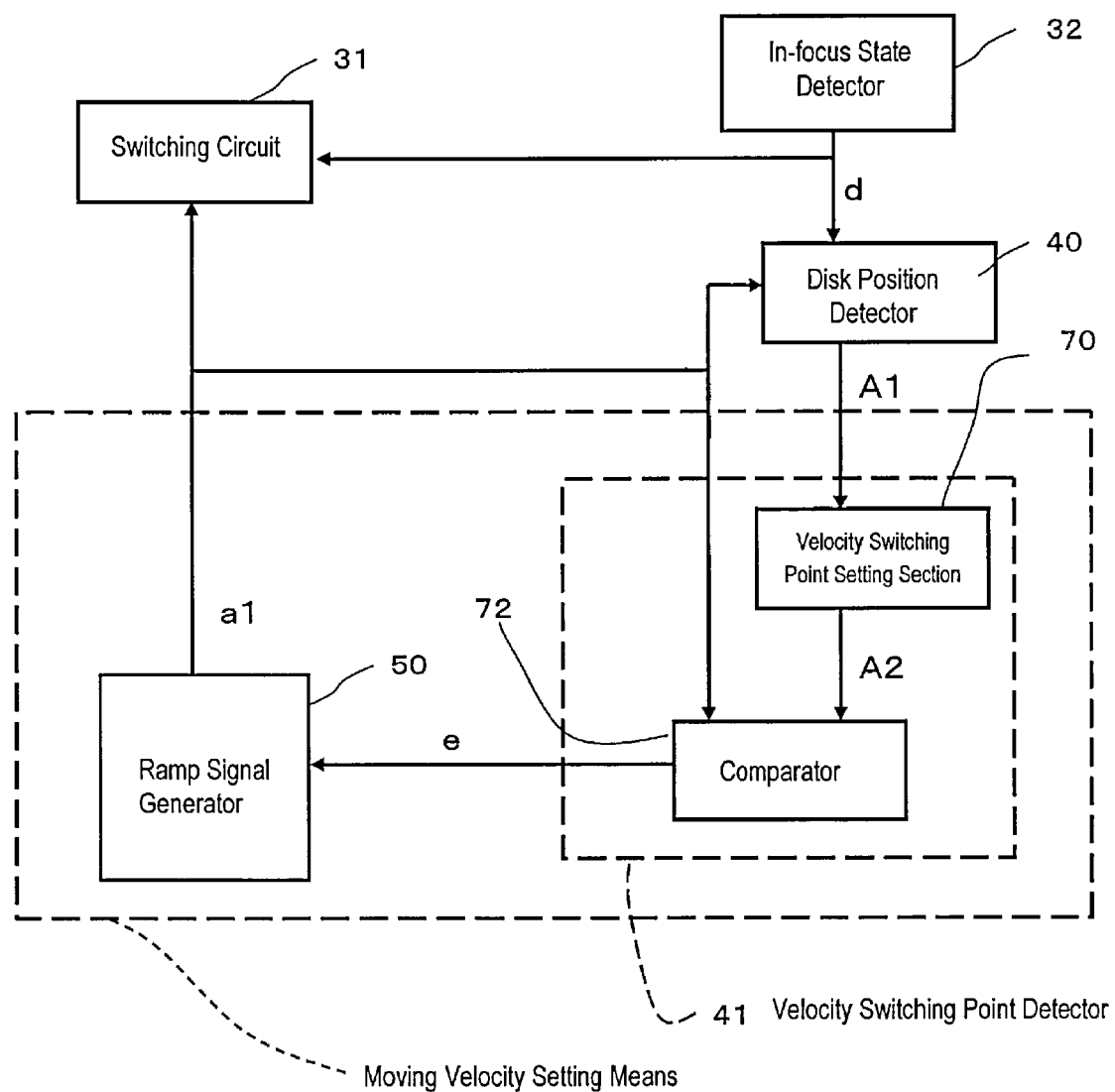

FIG. 7 shows a configuration for moving velocity setting means in the first preferred embodiment of an optical disk drive according to the present invention.

Figure 8:
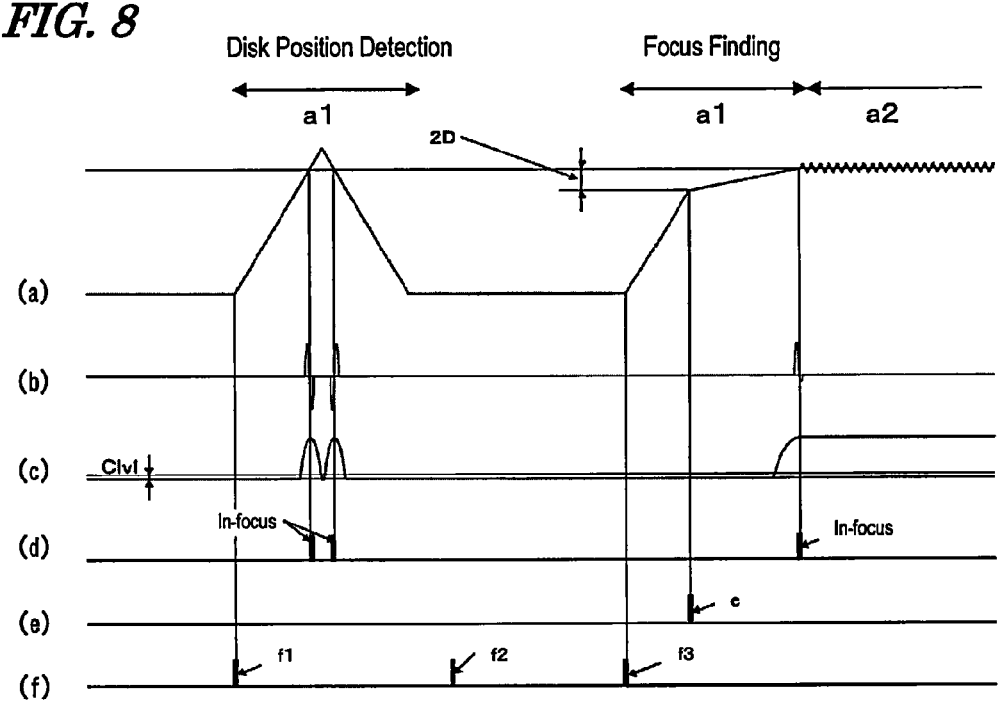

FIG. 8 shows how the first preferred embodiment of the optical disk drive of the present invention operates, wherein: portion (a) shows where the focus position of a light beam passes with time; portion (b) shows a focus error signal; portion (c) shows a reflected light intensity signal c; portion (d) shows an in-focus state detection signal d; portion (e) shows a velocity switching signal e; and portion (f) shows various instructions issued by a system controller.

Figure 9:
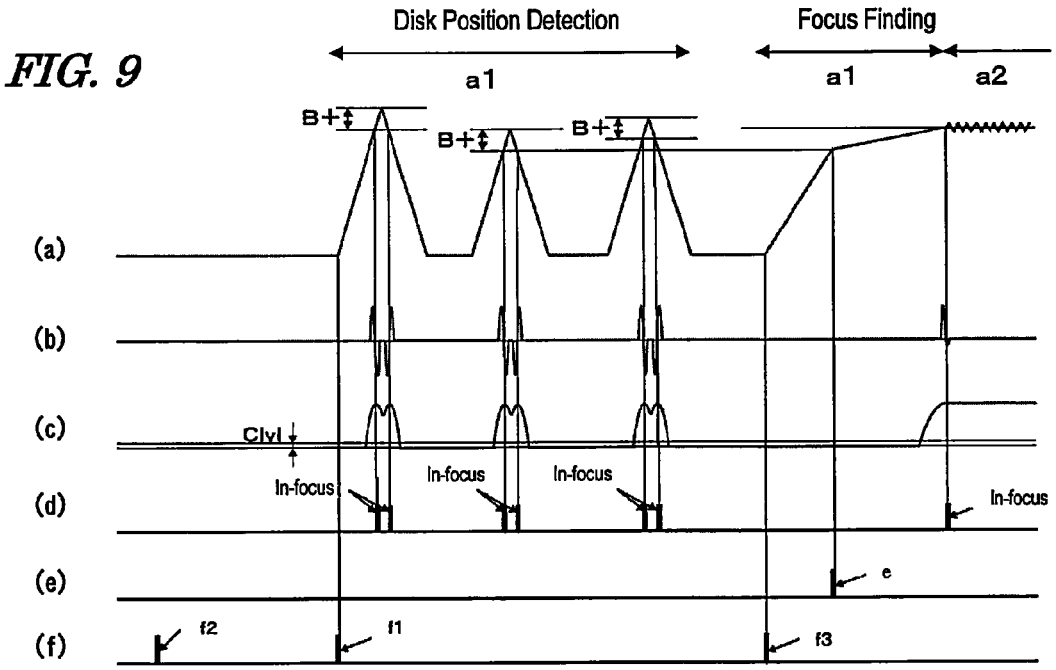

FIG. 9 shows how the second preferred embodiment of the optical disk drive of the present invention operates, wherein: portion (a) shows where the focus position of a light beam passes with time; portion (b) shows a focus error signal; portion (c) shows a reflected light intensity signal c; portion (d) shows an in-focus state detection signal d; portion (e) shows a velocity switching signal e; and portion (f) shows various instructions issued by a system controller.

Figure 10:
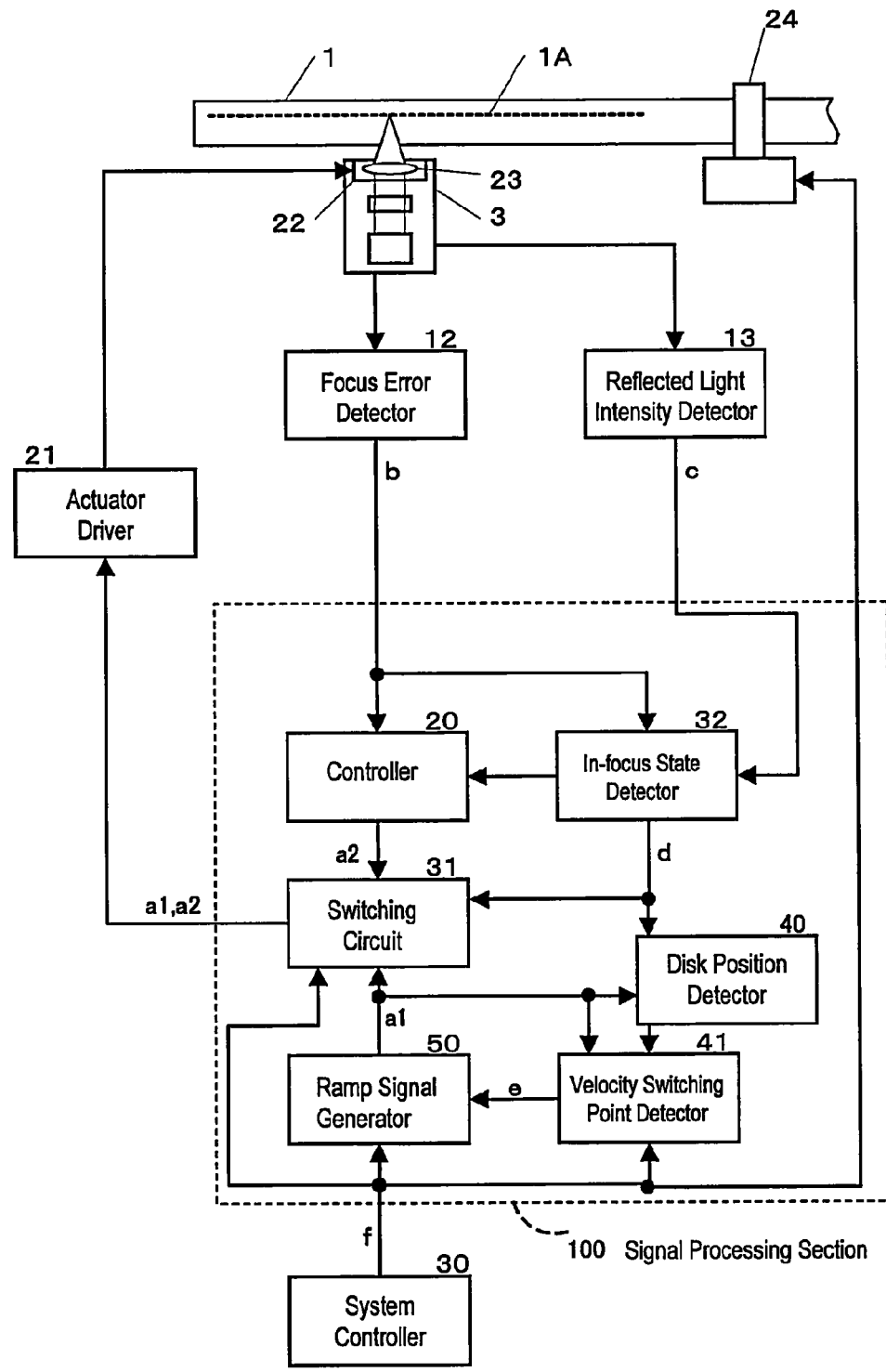

FIG. 10 is a block diagram showing a configuration for a third preferred embodiment of an optical disk drive according to the present invention.

Figure 11:
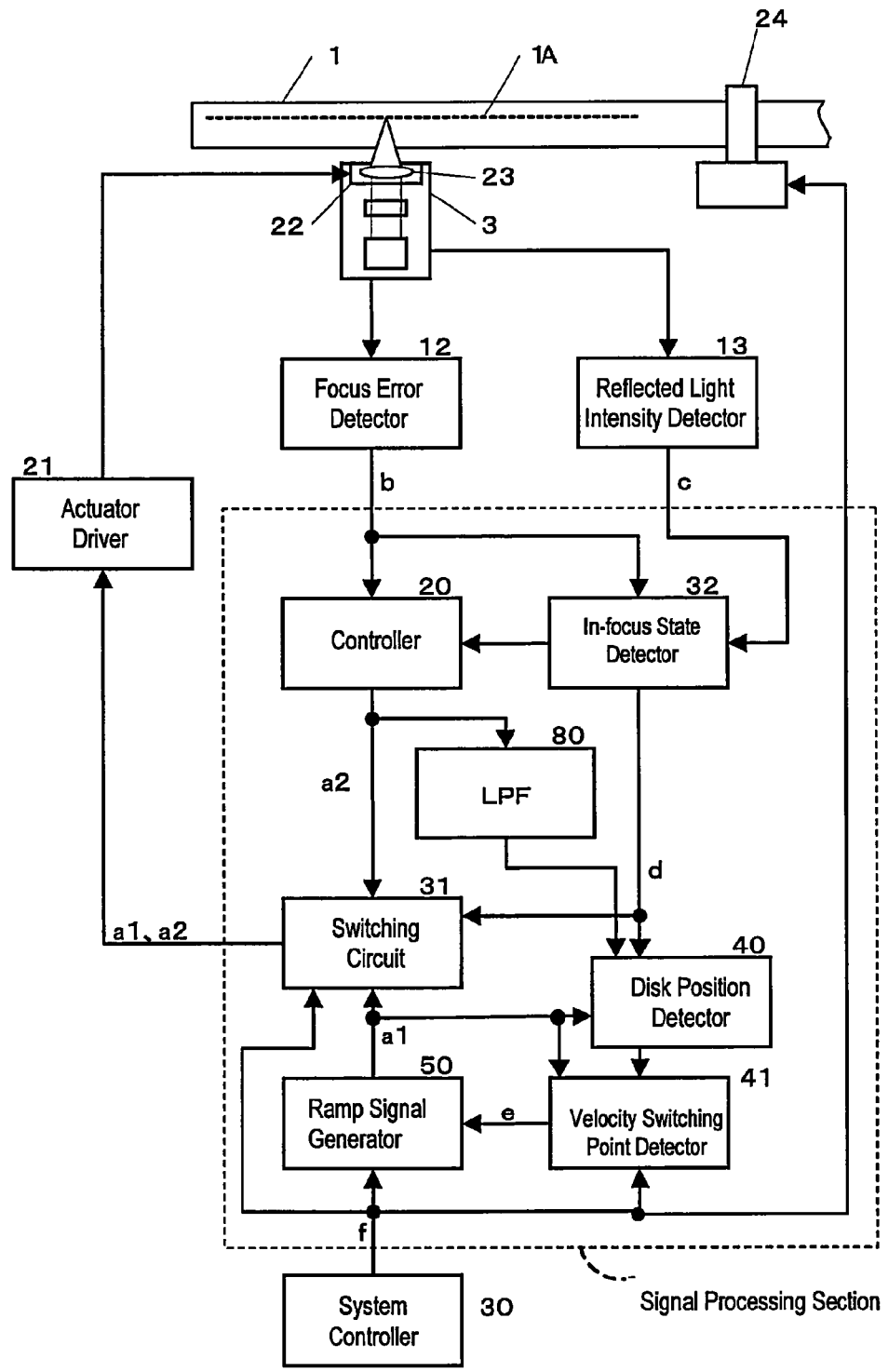

FIG. 11 is a block diagram showing a configuration for a fourth preferred embodiment of an optical disk drive according to the present invention.

Figure 12:
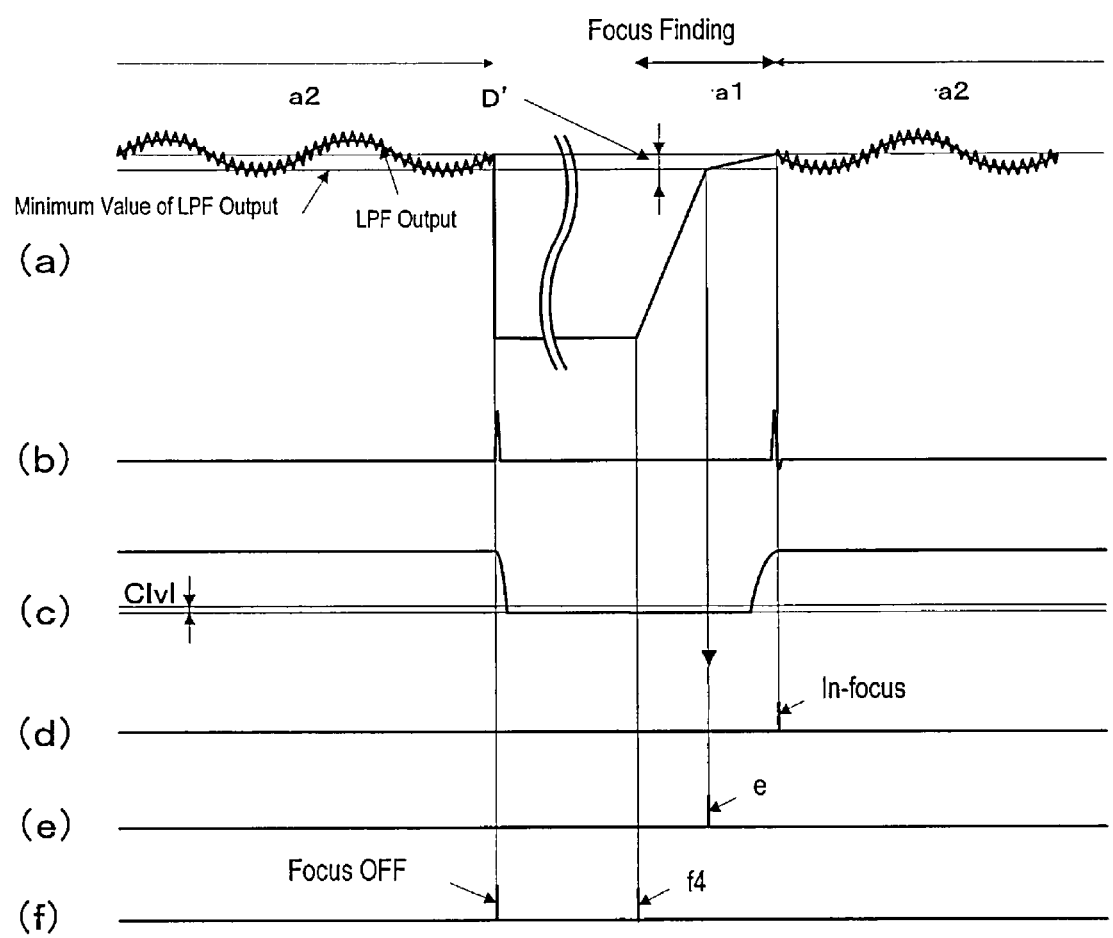

FIG. 12 shows how the fourth preferred embodiment of the optical disk drive of the present invention operates, wherein: portion (a) shows where the focus position of a light beam passes with time; portion (b) shows a focus error signal; portion (c) shows a reflected light intensity signal c; portion (d) shows an in-focus state detection signal d; portion (e) shows a velocity switching signal e; and portion (f) shows various instructions issued by a system controller.

Figure 13:
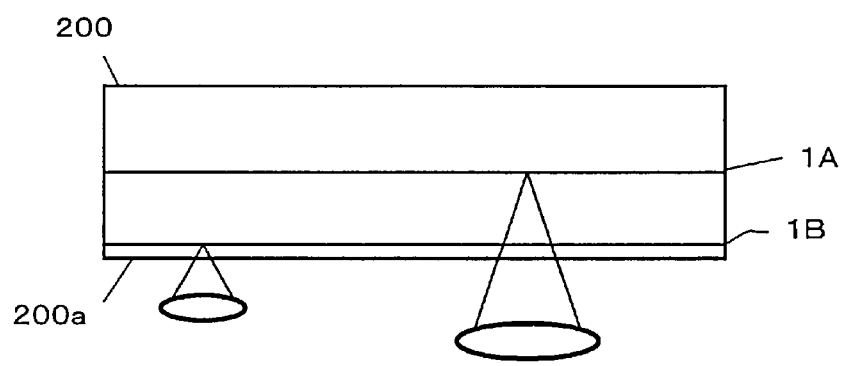

FIG. 13 is a cross-sectional view illustrating a hybrid optical disk that can be read from and written to by the optical disk drive of the fourth preferred embodiment.

Figure 14:
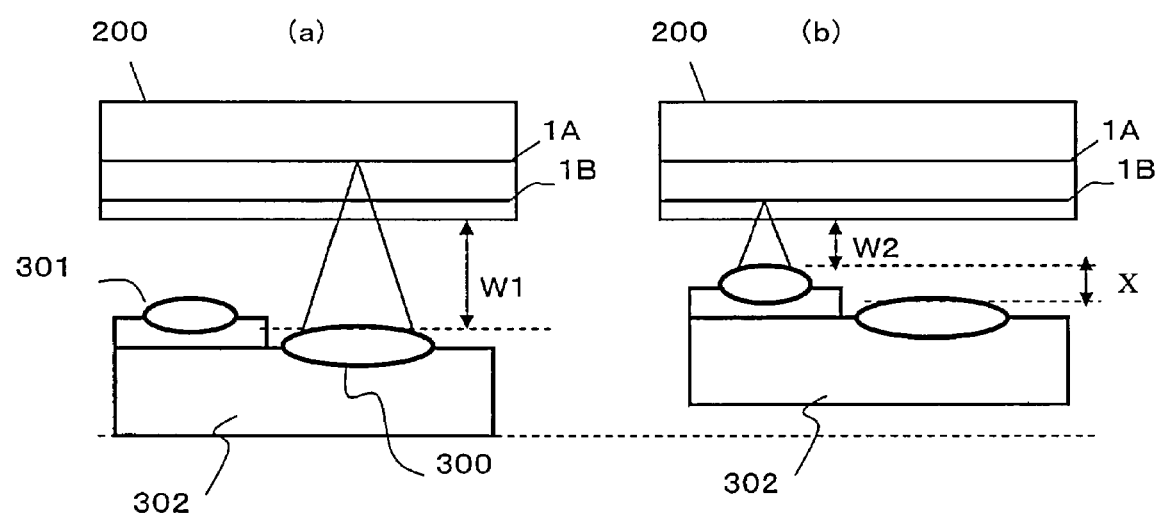

Portion (a) of FIG. 14 shows a lens unit 302, from which a light beam is converged on a DVD storage layer 1A of a hybrid optical disk 200, while portion (b) of FIG. 14 shows a lens unit 302, from which a light beam is converged on a BD storage layer 1B of the optical disk 200.

Figure 15:
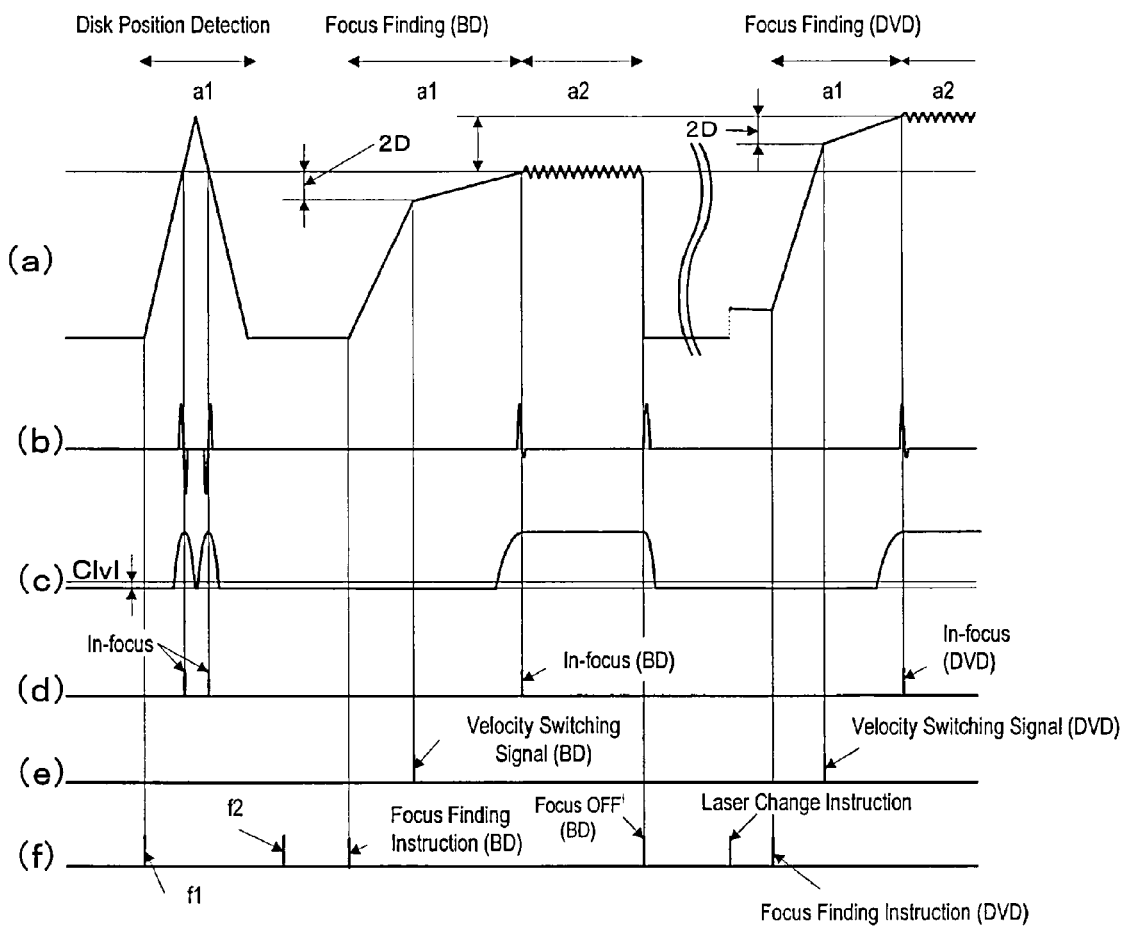

FIG. 15 shows how a fifth preferred embodiment of an optical disk drive according to the present invention operates, wherein: portion (a) shows where the focus position of a light beam passes with time; portion (b) shows a focus error signal; portion (c) shows a reflected light intensity signal c; portion (d) shows an in-focus state detection signal d; portion (e) shows a velocity switching signal e; and portion (f) shows various instructions issued by a system controller.

Figure 16:
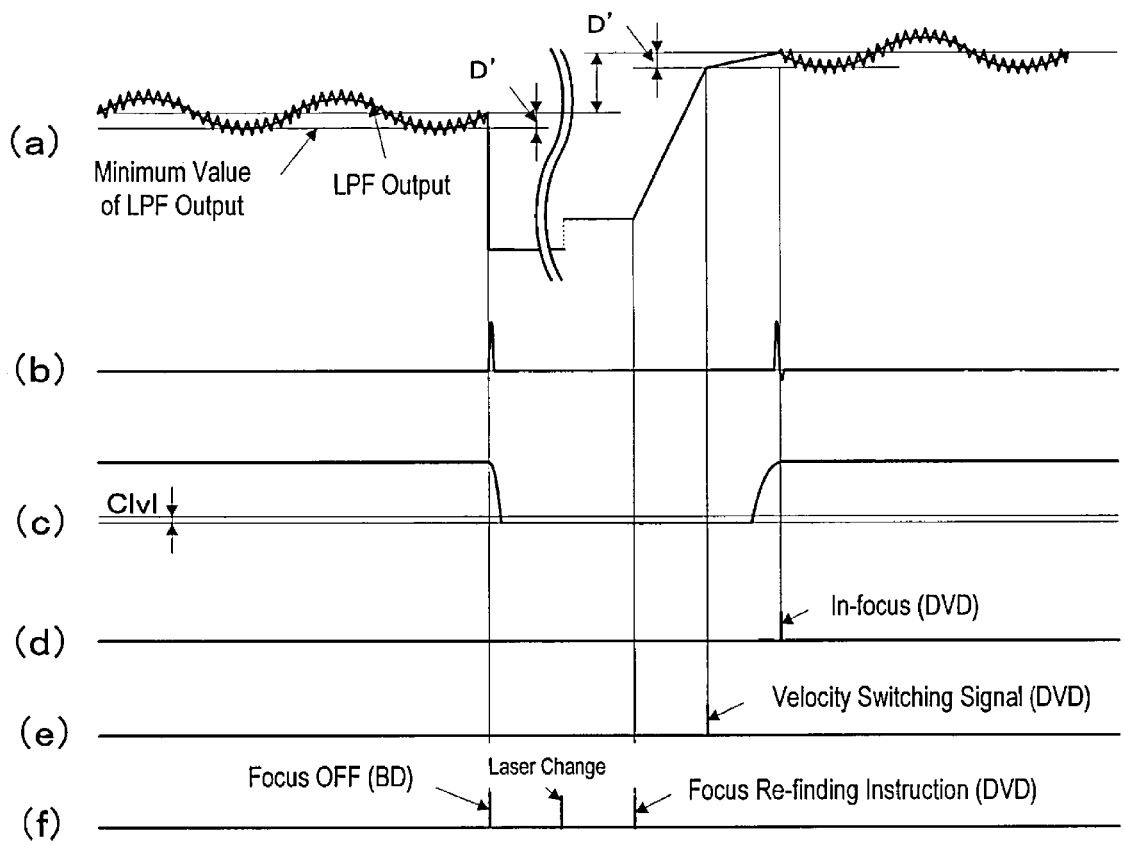

FIG. 16 shows how a sixth preferred embodiment of an optical disk drive according to the present invention operates, wherein: portion (a) shows where the focus position of a light beam passes with time; portion (b) shows a focus error signal; portion (c) shows a reflected light intensity signal c; portion (d) shows an in-focus state detection signal d; portion (e) shows a velocity switching signal e; and portion (f) shows various instructions issued by a system controller.

DETAILED DESCRIPTION OF PREFERRED EMBODIMENTS

Before preferred embodiments of the present invention are described, it will be described with reference to FIG. 4 basically how the optical disk drive of the present invention works. FIG. 4 schematically illustrates the positions of an objective lens 23 included in the pickup of the optical disk drive of the present invention (which will be referred to herein as "lens positions L") and the focus positions F of a light beam 200 that has been converged by the objective lens 23.

The optical disk 1 shown in FIG. 4 includes an information storage layer 1A, a substrate 102 that supports the information storage layer 1A thereon, and a transparent coating layer 104 that covers the information storage layer 1A. In FIG. 4, the objective lens 23 is illustrated at four different positions to show how the objective lens 23 gets closer to the information storage layer 1A of the optical disk 1.

When the optical disk 1 is loaded into the optical disk drive of the present invention, the objective lens 23 is located farthest away from the optical disk 1 (i.e., located at a retracted position). Thereafter, when the focus finding operation is started, the objective lens 23 is moved toward the optical disk 1 by an actuator (not shown). After that, when the focal point of the light beam 200 reaches the information storage layer 1A, the focus servo control is activated and the focus tracking described above is performed.

Before starting the focus finding operation, the optical disk drive of the present invention performs an operation of detecting the position of the information storage layer 1A. More specifically, before starting the focus finding operation, the optical disk drive detects the light that has been reflected from the optical disk 1 while moving the objective lens 23 toward the optical disk 1, thereby defining the lens position L when the focal point of the light beam 200 reaches the information storage layer 1A. Such an operation is not performed for the purpose of focus finding and therefore can be carried out with the objective lens 23 moved at a high velocity. The lens position L can be represented by a drive signal (which will be referred to herein as a "ramp signal") to be supplied to an actuator driver to move the objective lens 23 along the optical axis. There is typically proportionality between the magnitude of this ramp signal and the lens position L. That is why the lens position L can be known by the magnitude of the ramp signal. To define the lens position L when the focal point of the light beam 200 is located on the information storage layer 1A will be referred to herein as "detecting a disk position".

According to the present invention, before the focus finding operation is actually started, the "disk position" is detected and the position of the objective lens 23 when the focal point of the light beam 200 is located on the information storage layer 1A of the optical disk 1 is memorized in advance as the "disk position". More specifically, the magnitude of a ramp signal to be supplied to an actuator driver when the focal point of the light beam 200 is located on the information storage layer 1A of the optical disk 1 is stored as disk position information in a memory in the optical disk drive. Then, in moving the objective lens 23 toward the optical disk 1 by starting the focus finding operation after that, the moving velocity of the objective lens 23 is set to a relatively high value until the objective lens 23 reaches a "velocity switching point" to be determined by reference to the disk position information. This "velocity switching point" is set farther away from the optical disk 1 (i.e., behind the objective lens) than the position of the objective lens 23 is when the focal point of the light beam 200 is located on the information storage layer 1A of the optical disk 1. Once the objective lens 23 has passed the velocity switching point, the moving velocity of the objective lens 23 is decreased.

Hereinafter, preferred embodiments of an optical disk drive according to the present invention will be described.

Embodiment 1

A first specific preferred embodiment of an optical disk drive according to the present invention will be described with reference to FIG. 5, which is a block diagram showing a configuration for an optical disk drive according to the first preferred embodiment.

An optical disk drive according to this preferred embodiment includes an optical disk motor 24 to turn an optical disk 1 thereon, an optical pickup 3 for reading and/or writing data by irradiating the optical disk 1 with a light beam, a signal processing section (such as a digital signal processor (DSP)) 100 for performing various types of processing and computations on data in response to an electrical signal supplied from the optical pickup 3, and a system controller 30 for controlling the operation of the signal processing section 100 and so on. The signal processing section 100 is preferably implemented as a semiconductor large-scale integrated circuit (LSI) that performs various types of computations by digital signal processing. Such an LSI may be implemented as either a single chip or a combination of multiple chips and preferably includes an A/D converter for converting an analog signal into a digital signal and a D/A converter for converting a digital signal into an analog signal that have been integrated together on the same integrated circuit board.

The respective circuits that form the signal processing section 100 to be described in detail later do not always have to be implemented as hardware components. The various types of processing performed by this signal processing section 100 may be realized by either software only or a combination of software and hardware. If the processing is realized by means of software, the electrical signal supplied from the optical pickup 3 may be received as digital data and subjected to digital signal processing, thereby carrying out the various types of computations.

The optical disk 1 is a disklike storage medium with at least one information storage layer 1A. On receiving an instruction to rotate the disk from the system controller 30, the optical disk motor 24 rotates the optical disk 1 at a predetermined rotational velocity.

The optical pickup 3 includes an objective lens 23 for converging the light beam that has been radiated from a light source such as a semiconductor laser diode, an actuator 22 for changing the positions of the objective lens 23, and a photodetector that receives the light that has been reflected from the optical disk 1 and generates an electrical signal representing the intensity of the reflected light.

The output electrical signal of the photodetector is supplied to a focus error detector 12 and a reflected light intensity detector 13. In FIG. 5, the focus error detector 12 and reflected light intensity detector 13 are illustrated as being arranged outside of the optical pickup 3. However, these circuits 12 and 13 may be made of semiconductor devices that are integrated together with the photodetector in the optical pickup. Although not shown, the optical disk drive of this preferred embodiment further includes a circuit for generating a tracking error signal, which is required for tracking control.

The focus error detector 12 outputs a focus error signal b representing the magnitude of shift of the focus position of the objective lens 23 from the information storage layer 1A of the optical disk 1. Meanwhile, the reflected light intensity detector 13 outputs a reflected light intensity signal c, of which the amplitude is proportional to the intensity of the light that has been reflected from the optical disk 1.

The actuator 22 in the optical pickup 3 is driven in response to a drive signal supplied from an actuator driver 21 and changes the positions of the objective lens 23 according to the magnitude of this drive signal. The drive signal is typically a voltage signal. The higher the level of this voltage signal, the closer to the optical disk 1 the actuator 22 may bring the objective lens 23, for example.

An input terminal of the actuator driver 21 is connected to a switching circuit 31 and selectively receives either the output drive signal (which will be referred to herein as a "ramp signal") a1 of a ramp signal generator 50 or the output control signal a2 of a controller 20. However, if the drive signal a1 or the control signal a2 is represented as a digital signal inside of the signal processing section 100, the output of the switching circuit 31 is converted into an analog signal by a D/A converter (not shown). In the following description, however, even if a signal inside the signal processing section 100 is actually a digital signal, the digital signal is supposed to be an analog signal, of which the magnitude corresponds with that of digital signal, for the sake of simplicity.

In changing the positions of the objective lens 23 significantly to perform disk type recognition or focus finding, the switching circuit 31 passes the output drive signal (i.e., the ramp signal) a1 of the ramp signal generator 50 to the actuator driver 21. On the other hand, in closing the focus servo control loop, the switching circuit 31 supplies the output control signal a2 of the controller 20 to the actuator driver 21. In accordance with the drive signal (ramp signal) a1 or the control signal a2 that has been selectively supplied from the switching circuit 31, the actuator driver 21 drives the actuator 22, thereby adjusting the position of the objective lens 23. The control signal a2 output from the controller 20 has been generated based on the focus error signal b, while the ramp signal a1 output from the ramp signal generator 50 has been generated in accordance with the instruction given by the system controller 30. The ramp signal a1 is typically a signal, of which the voltage rises or falls with time.

A disk type recognizer 60 recognizes the type of the optical disk 1 that has been loaded into this optical disk drive by the focus error signal b and the reflected light intensity signal c. Examples of optical disks 1 that may be used in this preferred embodiment include BDs, DVDs and CDs. In this case, the disk type recognizer 60 recognizes the given optical disk 1 as a BD, a DVD or a CD. Such disk type recognition may be done by sensing how deep the information storage layer 1A is located as measured from the surface of the optical disk 1. In a BD, for example, the information storage layer 1A is located at a depth of about 0.1 mm as measured from the surface of the optical disk 1. In a CD, on the other hand, the information storage layer 1A is approximately 1.1 mm deep. And a DVD includes an information storage layer 1A at a depth of about 0.6 mm as measured from the surface of the optical disk 1. By performing a similar operation to the focus finding operation described above, the surface of the optical disk 1 and the information storage layer 1A can be located. Thus, the "depth" of the information storage layer 1A can be calculated as the distance between these two levels.

An in-focus state detector 32 detects the S-curve of the focus error signal b when the level of the reflected light intensity signal c is equal to or greater than a predetermined value Clvl and also detects the zero-cross point of the focus error signal b as the focus position. When the focal point of the light beam gets close to the information storage layer 1A, the light is reflected by the optical disk 1. That is why when the level of the reflected light intensity signal c becomes equal to or greater than a predetermined value, it can be determined that the focal point of the light beam has reached either the vicinity or the inside of the optical disk 1. However, even if the focal point of the light beam has not reached the information storage layer yet, the focus error signal b may have a small S-curve due to noise, for example. To avoid determining by mistake that the focal point has reached the information storage layer 1A in such a situation, the level of the reflected light intensity signal c needs to be equal to or greater than the predetermined Clvl according to this preferred embodiment to make such a decision.

By moving the objective lens 23 toward the optical disk 1 before starting the focus finding operation, a disk position detector 40 detects the position of the objective lens when the focal point of the light beam is located on the information storage layer 1A of the optical disk 1 as the "disk position" and memorizes the magnitude of the drive signal (i.e., the ramp signal) supplied to the actuator driver 21 at that point in time as information about the "disk position". And based on the magnitude of the ramp signal representing the "disk position", the "velocity switching point" is defined.

A velocity switching point detector 41 outputs a velocity switching signal e at an appropriate titanium while the objective lens 23 is being moved toward the optical disk 1 during the focus finding operation. The velocity switching signal e is output when the magnitude of the ramp signal being monitored during the focus finding operation reaches a value associated with the "velocity switching point". On receiving the velocity switching signal e, the ramp signal generator 50 operates so as to decrease the moving velocity of the objective lens 23.

Portion (a) of FIG. 6 shows how the level of the ramp signal a1 changes with the lens position according to this preferred embodiment, while portion (b) of FIG. 6 shows the output timing of the velocity switching signal e.

In portion (a) of FIG. 6, the abscissa represents the magnitude (i.e., the voltage) of the ramp signal a1 supplied to the actuator driver 21, while the ordinate represents the position of the objective lens 23. When the ramp signal a1 is supplied to the actuator driver 21, an amount of current, corresponding to the magnitude of the ramp signal a1, is supplied from the actuator driver 21 to the coil (not shown) of the actuator 22. The current flowing through the coil of the actuator 22 generates a magnetic field around the coil, thereby moving the objective lens 23. Since elastic force is applied from a spring (not shown) to the objective lens 23, a large amount of current needs to be supplied to the coil to move the objective lens 23 greatly. When no current is supplied to the coil, the objective lens 23 is located at a reference position that is determined by the elastic force applied by the spring. Meanwhile, if current flowing in the reverse direction is supplied to the coil, the objective lens 23 moves away from the optical disk with respect to the reference position.

In the example illustrated in portion (a) of FIG. 6, the objective lens 23 is initially located at a retracted position P0. At this point in time, the ramp signal a1 has a value A0 (i.e., a negative voltage) and the flowing direction of the current supplied from the actuator driver 21 to the actuator 22 is opposite to that of the current supplied during a normal operation.

As the level of the ramp signal a1 is increased after the focus finding operation has been started, the lens position goes upward on the paper. In the meantime, the amount of the current supplied from the actuator driver 21 to the actuator 22 increases proportionally to the magnitude of the ramp signal a1.

In Portion (a) of FIG. 6, the magnitude of the ramp signal a1 when the objective lens 23 is located at a lens position P1, corresponding to the "disk position", is identified by A1. In this preferred embodiment, when the magnitude of the ramp signal a1 reaches A2, which is smaller than A1 (i.e., when the objective lens 23 reaches a lens position P2), the objective lens 23 starts to be decelerated.

The objective lens 23 is decelerated in response to the velocity switching signal supplied from the velocity switching point detector 41. Hereinafter, this point will be described in detail with reference to FIG. 7, which shows a configuration for moving velocity setting means according to this preferred embodiment.

In this preferred embodiment, the moving velocity setting means of the present invention is formed by the ramp signal generator 50 and the velocity switching point detector 41, which includes a velocity switching point setting section 70 and a comparator 72.

The velocity switching point setting section 70 is a memory that is notified of the magnitude A1 of the ramp signal a1, which is associated with the disk position that has been defined by the disk position detector 40, calculates A2 by subtracting A1, and stores A2 as the magnitude of the ramp signal a1 representing the velocity switching point. During the focus finding operation, the comparator 72 receives the ramp signal a1 from the ramp signal generator 50 and compares the magnitude of the ramp signal a1 with the magnitude A2. As soon as it has been turned out, as a result of the comparison, that the magnitude of the ramp signal a1 has become equal to or greater than A2, the comparator 72 sends a velocity switching signal e to the ramp signal generator 50.

Thus, according to this preferred embodiment, before the objective lens 23 actually reaches the disk position, the velocity switching signal e is output. That is to say, at the point in time when the objective lens passes the velocity switching point that precedes the disk position that has been detected in advance, the velocity switching point detector 41 outputs the velocity switching signal e. In this preferred embodiment, the distance $\Delta$ between the disk position and the velocity switching point (=lens position P1−lens position P2) is determined by the maximum allowable amplitude ±D of the disk flutter (i.e., the out-of-plane vibration) of the optical disk 1 that is defined by a standard. In other words, the distance $\Delta$ between the disk position and the velocity switching point is set equal to the peak-to-peak value (p-p value) of the maximum allowable amplitude of the disk flutter. For example, if D=0.1 mm, the p-p value is equal to 2D (=0.2 mm). In that case, the point 0.2 mm before the position of the objective lens (i.e., the disk position) when the focal point of the light beam is actually located on the information storage layer is defined as the velocity switching point. It should be noted that the greater the maximum allowable amplitude of the disk flutter, the more distant from the optical disk the velocity switching point becomes.

Hereinafter, the focus finding operation of this preferred embodiment will be described with reference to FIGS. 5 and 8. In FIG. 8, portion (a) shows where the focus position of the light beam passes with time, portion (b) shows the waveform of the focus error signal, portion (c) shows the waveform of the output signal of the reflected light intensity detector (i.e., the reflected light intensity signal), portion (d) shows the output times of an in-focus state detection signal, portion (e) shows the velocity switching point of the objective lens, and portion (f) shows the times when the system controller issues various instructions. It should be noted that the waveforms to appear on the focus error signal, for example, due to the light that has been reflected from the surface of the optical disk are not shown in FIG. 8. The same statement will apply to the other waveform charts.

First, when the optical disk 1 is loaded into the optical disk drive, the system controller 30 issues a disk type recognition instruction f1 as shown in portion (f) of FIG. 8. In response to the disk type recognition instruction f1, the ramp signal generator 50 shown in FIG. 5 outputs a ramp signal that will move the objective lens 23 up and down at a high velocity. The ramp signal a1 is input to the actuator driver 21 by way of the switching circuit 31. As a result, the actuator 22 moves the objective lens 23 up and down at a high velocity, and therefore, the focus position of the light beam changes in a triangular wave as shown in portion (a) of FIG. 8. Meanwhile, the focus error signal b shows two S-curves as shown in portion (b) of FIG. 8, and the reflected light intensity signal c also has tow humps as shown in portion (d) of FIG. 8, which means that the focal point of the light beam has passed the information storage layer twice (i.e., the focal point has made a round trip) while the objective lens 23 is being moved up and down.

Based on the focus error signal b and the reflected light intensity signal c that have been generated as a result of these operations, the disk type recognizer 60 recognizes the type of the given optical disk 1. At this point in time, the disk position detector 40 detects the disk position based on the output d of the in-focus state detector 32 and the output signal of the ramp signal generator 50 (i.e., the ramp signal a1). Furthermore, the velocity switching point setting section 70 shown in FIG. 7 sets the velocity switching point with respect to the disk position as described above.

After the velocity switching point has been defined, the system controller 30 issues an optical disk rotation instruction f2 as shown in portion (f) of FIG. 8. In response to this disk rotation instruction f2, the disk motor 24 starts to rotate the optical disk 1 at a predetermined rotational velocity.

Next, the system controller 30 issues a focus finding instruction f3 as shown in portion (f) of FIG. 8. In response to this focus finding instruction f3, the ramp signal generator 50 outputs a drive signal to move the objective lens 23 toward the optical disk 1 at a high velocity. In accordance with this drive signal, the actuator driver 21 starts to drive the actuator 22, which moves the objective lens 23 toward the optical disk 1 at a high velocity.

On sensing that the magnitude of the ramp signal a1, which is the output signal of the ramp signal generator 50, has become equal to the value A2 associated with the velocity switching point that has been defined in advance, the velocity switching point detector 41 outputs the velocity switching signal e. In response to this velocity switching signal e, the ramp signal generator 50 changes the ramp signal a1 so as to switch the moving velocities of the objective lens 23 into a lower velocity. As a result, the moving velocity of the objective lens 23 decreases as shown in portion (a) of FIG. 8.

Thereafter, when the focal point of the light beam approaches the information storage layer 1A of the optical disk 1, the in-focus state detector 32 tries detecting the in-focus state by reference to the focus error signal b and the reflected light intensity signal c. And on detecting the in-focus state, the in-focus state detector 32 sends a switching control signal d to the switching circuit 31. In response to this control signal d, the switching circuit 31 starts sending the control signal a2 supplied from the controller 20 to the actuator driver 21 instead of the ramp signal a1 that has been supplied from the ramp signal generator 50. In this manner, the focus finding operation of this preferred embodiment is finished.

As described above, according to this preferred embodiment, when the disk type recognizer 60 recognizes the type of the given disk, the disk position detector 40 detects the disk position based on the respective outputs of the in-focus state detector 32 and the ramp signal generator 50. Then, a velocity switching point is set by shifting the disk position by the maximum allowable amplitude of the disk flutter that is defined by the standard. And the moving velocities of the objective lens are switched at the velocity switching point during the focus finding operation. As a result, the focus finding operation can get done at higher speeds and with good stability.

In the preferred embodiment described above, the disk type recognizer 60 detects the disk position by taking advantage of the disk type recognition operation to be done with the objective lens moved up and down. Consequently, it takes no additional time to detect the disk position and the focus finding operation can be speeded up.

The processing step of moving the objective lens 23 for the disk type recognition purposes can be finished in a short time. Hereinafter, this point will be described.

First, if there is no need to perform the disk type recognition operation, the objective lens 23 needs to be moved up and down in order to detect the disk position. When the objective lens 23 is moved up and down for the purpose of disk position detection, there is no need to perform the focus finding operation. That is why the objective lens may be moved at approximately ten times as high a velocity as the low moving velocity for the focus finding operation. Consequently, even if the disk position detection operation is performed before the focus finding operation, the focus finding operation can still be finished in a sufficiently short time.

In a conventional disk type recognition operation in which the objective lens is moved at a constant velocity, it takes approximately one second to move the objective lens over a total distance of 0.5 mm at a velocity of 0.5 mm per second. On the other hand, when the disk position detection operation is performed, the objective lens can make a round trip over the total distance of 0.5 mm at a velocity of 5 mm per second. In that case, the disk position can be detected in just 0.2 seconds.

Suppose the focus finding operation of this preferred embodiment is carried out with a gap of 0.1 mm provided between the velocity switching point and the disk position. More specifically, suppose the objective lens is moved at a high velocity of 5 mm/s for the first 0.4 mm (i.e., up to the velocity switching point) out of the total distance of 0.5 mm and then moved at a low velocity of 0.5 mm/s for the remaining 0.1 mm. In that case, it takes 0.08 seconds to make the high-velocity movement as the first stage of the focus finding operation and takes 0.2 seconds to make the low-velocity movement as the second stage thereof. Thus, it takes 0.28 seconds overall to get the focus finding operation done. Even if the time it takes to get the disk position detection operation done (of 0.2 seconds in this example) is added to this amount of time, the grand total is still just 0.48 seconds, which is less than a half of the amount of time (of one second) it takes to get the focus finding operation done at a constant velocity. Consequently, even if the disk position detection operation is carried out separately before the focus finding operation is started, the focus finding operation can still get done in a sufficiently shorter amount of time.

The velocity switching point setting section 70 determines the velocity switching point with the maximum allowable amplitude of the disk flutter of the optical disk, which is defined by the standard, taken into account. Therefore, even if the focal length and depth of focus of the objective lens increase, the focus finding operation can get done with good stability without letting the objective lens collide against the optical disk. It should be noted that when the velocity switching point is figured out with respect to the disk position detected, the maximum allowable amplitude of the disk flutter defined by the standard could be replaced with the amplitude of the disk flutter of the optical disk actually used.

In the preferred embodiment described above, the distance between the disk position and the velocity switching point is set equal to the p-p value (2D) of the maximum allowable amplitude of the disk flutter. Alternatively, the distance may also be defined by multiplying 2D by another constant (e.g., 2D×0.9). If the maximum allowable amplitude of the disk flutter changes from one type of an optical disk to another, an appropriate maximum allowable amplitude of disk flutter may be selected according to the type of the given optical disk that has been recognized by the disk type recognition operation such that the distance between the disk position and the velocity switching point may be changed according to the type of the given optical disk.

For example, as for a CD, the maximum allowable amplitude of the disk flutter as defined by a CD standard is ±0.5 mm and 2D is equal to 1.0 mm. As for a BD, on the other hand, the maximum allowable amplitude of the disk flutter as defined by a BD standard is ±0.1 mm and 2D is equal to 0.2 mm. That is why if the optical disk that has been loaded into the optical disk drive has been recognized as a CD, the velocity switching point may be set 1.0 mm before the disk position. On the other hand, if the optical disk has been recognized as a BD, then the velocity switching point may be set 0.2 mm before the disk position. Suppose the distance between the velocity switching point and the disk position is never changed no matter what type of optical disk has been loaded. In that case, even if a BD has been loaded, the distance between the velocity switching point and the disk position still needs to be 1.0 mm, and therefore, the objective lens starts to be decelerated too early. As a result, the focus finding operation cannot be finished in a short time anymore, which will decrease the efficiency. For that reason, the distance between the velocity switching point and the disk position is preferably optimized according to the type of the given optical disk.

Also, in the preferred embodiment described above, the moving velocities of the objective lens are switched in two stages (i.e., high velocity and low velocity). Alternatively, the moving velocities of the objective lens may be changed in three or more stages by setting a plurality of velocity switching points. For example, first and second velocity switching points may be set 3D and 2D away from the disk position, respectively, and the moving velocities of the objective lens may be switched from a high velocity into an intermediate velocity and then into a low velocity.

Embodiment 2

Hereinafter, a second preferred embodiment of an optical disk drive according to the present invention will be described with reference to FIGS. 5 and 9. The basic configuration of the optical disk drive of this preferred embodiment is the same as that shown in FIG. 5. The difference between the first and second preferred embodiments is how to set the velocity switching point. In FIG. 9, portion (a) shows where the focus position of the light beam passes with time, portion (b) shows the waveform of the focus error signal, portion (c) shows the waveform of the output signal of the reflected light intensity detector (i.e., the reflected light intensity signal), portion (d) shows the output times of an in-focus state detection signal, portion (e) shows the velocity switching point of the objective lens, and portion (f) shows the times when the system controller 30 issues various instructions.

In this preferred embodiment, the system controller 30 outputs the disk rotation instruction f2 before issuing the disk type recognition instruction f1 as shown in portion (f) of FIG. 9. In accordance with the disk rotation instruction f2, the optical disk motor 24 starts to turn the optical disk 1. After that, when the rotational velocity of the optical disk 1 reaches a predetermined level, the system controller 30 issues the disk type recognition instruction f1.

Figure 1:
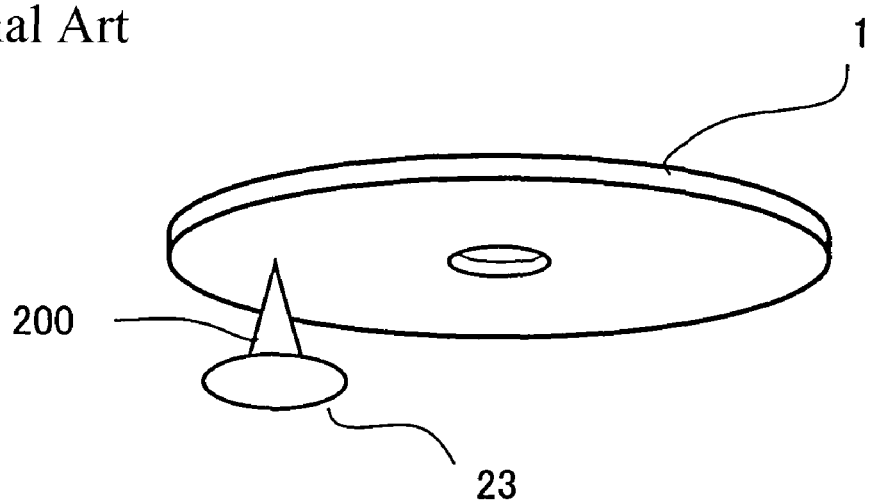
FIG. 1 is a perspective view showing an arrangement of an objective lens 23 with respect to an optical disk 1.
Figure 2:
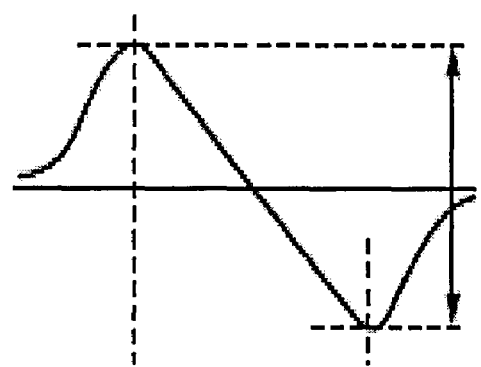
FIG. 2 shows a waveform of a focus error signal.
Figure 5:
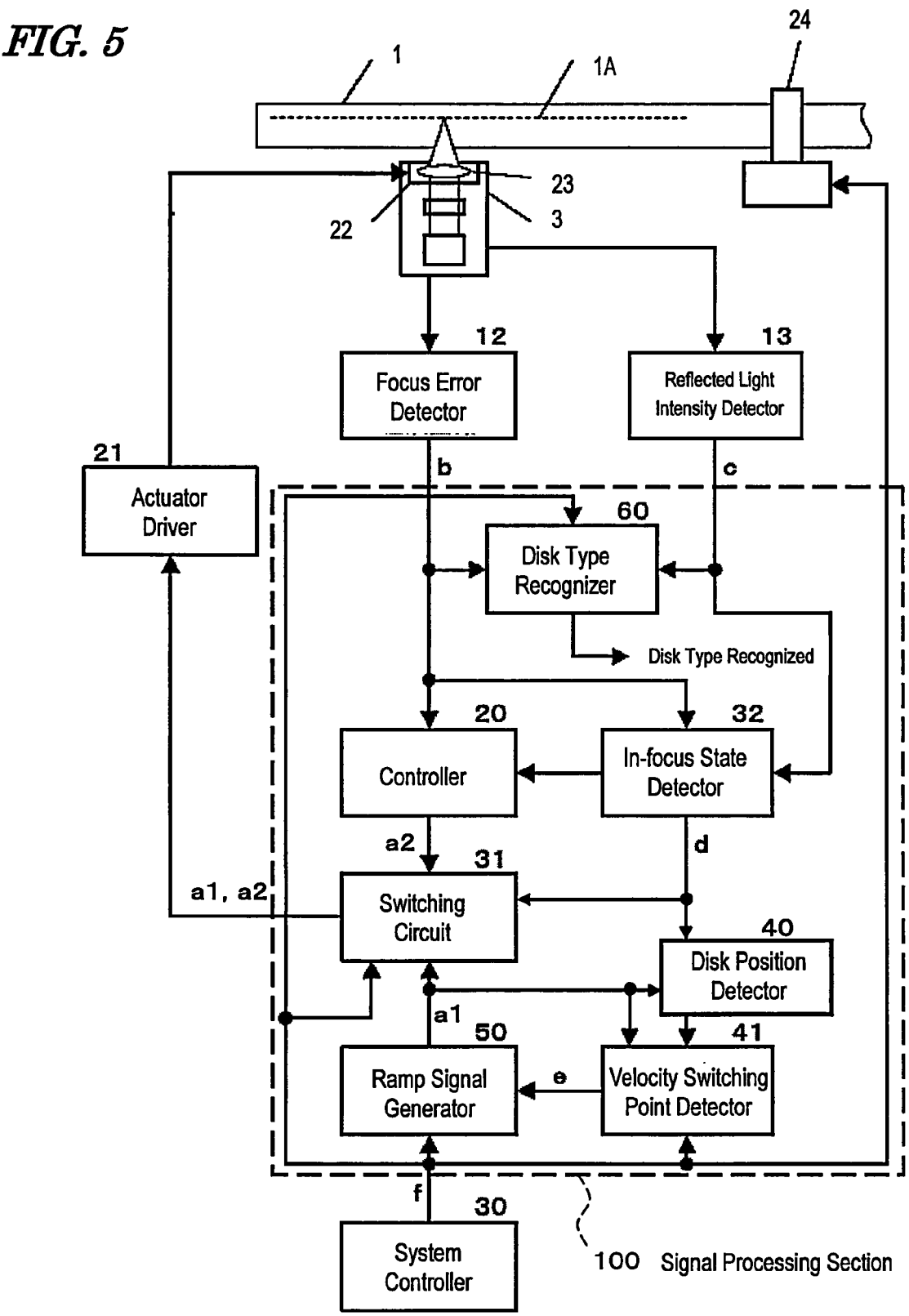
FIG. 5 is a block diagram showing a configuration for a first preferred embodiment of an optical disk drive according to the present invention.

In response to this disk type recognition instruction f1, the ramp signal generator 50 shown in FIG. 5 moves the objective lens 23 up and down at a high velocity. In this preferred embodiment, while the optical disk 1 is being turned, the objective lens 23 is moved up and down three times under mutually different locations on the optical disk 1. The objective lens 23 that has been moved upward starts to be moved downward when the objective lens 23 has come closer to the optical disk 1 by a predetermined distance of B+ after the disk position detector 40 has detected the in-focus state detection signal generated by the in-focus state detector 32 (see portions (a) and (b) of FIG. 9).

The focal point of the light beam crosses the information storage layer 1A at three different levels (or heights) as shown in portion (a) of FIG. 9. This is because since the optical disk 1 is rotating with a disk flutter, the level of the information storage layer 1A varies every time the focal point of the light beam crosses the information storage layer 1A. In other words, by detecting the in-focus state a number of times while the optical disk 1 is rotating, it can be sensed how low the information storage layer 1A can reach due to the disk flutter.

Among those focus positions that have been detected by moving the objective lens 23 up and down a number of times, the disk position detector 40 of this preferred embodiment selects one of those focus positions that is farthest away from the optical disk 1 as the disk position. In this manner, the velocity switching point can be defined by the actual amplitude of the disk flutter. As a result, the velocity switching point can be brought as close to the optical disk as possible with the unnecessary slow-down interval, which would often be present if the velocity switching point is defined by the maximum allowable amplitude of the disk flutter according to a standard, cut down. On top of that, if the objective lens 23 is moved up and down a number of times during the disk type recognition operation, the type of the given optical disk 1 can be recognized more accurately.

Next, the system controller 30 issues a focus finding instruction f3 as shown in portion (f) of FIG. 9. In response to this focus finding instruction f3, the ramp signal generator 50 outputs a drive signal to move the objective lens 23 toward the optical disk 1 at a high velocity. In accordance with this drive signal, the actuator driver 21 starts to drive the actuator 22, which moves the objective lens 23 toward the optical disk 1 at a high velocity.

On sensing that the magnitude of the drive signal (i.e., the ramp signal) a1, which is the output signal of the ramp signal generator 50, has become equal to the value associated with the velocity switching point that has been defined in advance, the velocity switching point detector 41 outputs the velocity switching signal e. In response to this velocity switching signal e, the ramp signal generator 50 changes the ramp signal a1 so as to switch the moving velocities of the objective lens 23 into a lower velocity. As a result, the moving velocity of the objective lens 23 decreases as shown in portion (a) of FIG. 9.

Thereafter, when the focal point of the light beam approaches the information storage layer 1A of the optical disk 1, the in-focus state detector 32 tries detecting the in-focus state by reference to the focus error signal b and the reflected light intensity signal c. And when the in-focus state detector 32 detects the in-focus state, the controller 20 generates a control signal and the switching circuit 31 outputs the control signal to the actuator driver 21.

In this preferred embodiment, the optical disk 1 is actually turned during the disk type recognition operation. Thus, by moving the objective lens 23 up and down, the in-focus state (or the focus position) can be detected under mutually different locations on the optical disk. As a result, the vertical vibrations of the optical disk due to the actual disk flutter can be sensed and the lowest level that the optical disk can possibly reach can be actually detected. Generally speaking, the maximum allowable amplitude of disk flutter as defined by an optical disk standard is bigger than the actual amplitude of disk flutter. Besides, the actual amplitude of disk flutter is also changeable with how to load the optical disk. That is why if the velocity switching point is defined by detecting the actual amplitude of disk flutter as is done in this preferred embodiment, the velocity switching point can be brought closer to the optical disk, and the focus finding operation can get done in a shorter time, compared to the method of setting a unique velocity switching point by the maximum allowable amplitude of disk flutter as defined by a standard.

Also, according to this preferred embodiment, the timing of switching the moving directions of the objective lens 23 from upward into downward is set by reference to the output of the in-focus state detector 32. As a result, it is possible to prevent the objective lens 23 from reaching an excessively high position and the collision between the objective lens 23 and the optical disk 1 can be avoided. If the optical system has a high NA and if there is only a small gap between the objective lens 23 and the optical disk 1 when the objective lens 23 is elevated, the risk of collision increases. In the preferred embodiment described above, the objective lens 23 is moved further upward by a predetermined distance of B+ after the in-focus state has been detected. Alternatively, the objective lens 23 may start to be moved downward as soon as the in-focus state is detected.

Furthermore, in the preferred embodiment described above, the lowest level of the information storage layer 1A that has been detected actually is defined as the velocity switching point. Alternatively, the velocity switching point may also be even lower than the lowest level of the information storage layer 1A by a predetermined distance. The velocity switching point may be set by the velocity switching point setting section 70 shown in FIG. 7.

Embodiment 3

Hereinafter, a third preferred embodiment of an optical disk drive according to the present invention will be described with reference to FIG. 10. The basic configuration of the optical disk drive of this preferred embodiment is the same as that shown in FIG. 5. However, the optical disk drive of this preferred embodiment includes no disk type recognizer 60 unlike the counterpart shown in FIG. 5. The optical disk drive of this preferred embodiment may be dedicated to BDs, for example, and does not perform the operation of recognizing the type of the optical disk loaded.

The optical disk drive of this preferred embodiment operates substantially in the same way as the counterpart of the first preferred embodiment that has already been described with reference to FIG. 8. According to this preferred embodiment, however, the disk position detection operation shown in FIG. 8 cannot be finished when the disk type recognition operation is performed. That is why before the focus finding operation is started, the disk position needs to be defined by moving the objective lens up and down perpendicularly to the information storage layer of the optical disk.

Optionally, the BD-dedicated disk drive of this preferred embodiment may detect the disk position by performing the operations shown in FIG. 9 instead of those shown in FIG. 8.

Embodiment 4

Hereinafter, a fourth preferred embodiment of an optical disk drive according to the present invention will be described with reference to FIGS. 11 and 12.

First, referring to FIG. 11, shown is the configuration of an optical disk drive according to this preferred embodiment. The major difference between the optical disk drive of this preferred embodiment and the counterpart shown in FIG. 5 is that the disk drive of this preferred embodiment further includes a low pass filter (LPF) 80 that generates a signal by filtering out high-frequency components from the output signal of the controller 20 and supplies that signal to the disk position detector 40. No disk type recognizer 60 is shown in FIG. 11 because the disk type recognizer 60 is not an essential component for this preferred embodiment. The disk type recognizer 60 may be provided as in the first preferred embodiment or may be omitted as in the third preferred embodiment.

The key feature of this preferred embodiment is that the disk position detector 40 detects the disk position based on the output of the LPF 80 and sets the velocity switching point based on the disk position. Thus, this point will be described in detail but the operations of respective components that are also included in the first preferred embodiment will be not described again.

In the following example, it will be described with reference to FIG. 12 what if the focal point has once shifted during a normal focus control operation and then a focus finding operation is started all over again.

In FIG. 12, portion (a) shows where the focus position of the light beam passes with time, portion (b) shows the waveform of the focus error signal, portion (c) shows the waveform of the output signal of the reflected light intensity detector (i.e., the reflected light intensity signal), portion (d) shows the output times of an in-focus state detection signal, portion (e) shows the velocity switching point of the objective lens, and portion (f) shows the times when the system controller issues various instructions.

As shown on the left-hand side of portion (a) of FIG. 12, while a focus control is being carried out, the focus position of the light beam gently waves up and down so as to keep up with the out-of-plane vibration of the optical disk. This gentle waving is shown in neither FIG. 8 nor FIG. 9 for the sake of simplicity.

It should be noted that the focus position of a light beam not only waves gently at low frequencies due to the out-of-plane vibration of the optical disk but also vibrates subtly at high frequencies. Those subtle vibrations are caused by the servo control that works to bring the focal point of the light beam back onto the information storage layer if the focal point has slightly shifted from the information storage layer.

As shown in portion (a) of FIG. 12, while the focus control is being carried out, the focus position of the light beam reflects the actual disk flutter. Thus, by detecting the position of the objective lens 23 (see FIG. 11) in that state, the disk position can be detected. More specifically, the lowest level that the optical disk can reach due to the disk flutter corresponds to the minimum value of the LPF. That is why the ramp signal a1 supplied to the actuator driver 21 when the output of the LPF becomes minimum is stored in the memory in association with the velocity switching point.

Portion (a) of FIG. 12 shows the behavior of the focus position of the light beam. This focus position is defined not only by the position of the objective lens 23 (see FIG. 11) in the optical axis direction (i.e., perpendicularly to the optical disk 1) but also by the control signals a1 and a2 to be supplied to the actuator driver 21. That is to say, while a read/write operation is being performed on the storage layer 1A, the output of the controller 20 (i.e., the control signal a2) is supplied to the actuator driver 21 by way of the switching circuit 31. The output of the controller 20 (i.e., the control signal a2) varies as represented by the curve shown in portion (a) of FIG. 12. Consequently, if the output of the LPF can be obtained by filtering out high-frequency components from this control signal a2, the variation in the optical disk position due to the disk flutter can be detected.

In this preferred embodiment, the disk position detector 40 determines the optical disk position based on the LPF output that has been obtained by getting the high-frequency components of the control signal a2 filtered out by the LPF 80 shown in FIG. 11. More specifically, the center of the amplitude of the optical disk 1 that vibrates vertically due to the disk flutter is defined as the disk position and the minimum value of the LPF output to be obtained when the optical disk 1 reaches the lowest level is associated with the velocity switching point.

If the focal point has shifted for some reason after that, the system controller issues a "focus OFF" instruction as shown in portion (f) of FIG. 12. In accordance with this instruction, the ramp signal generator 50 lowers (i.e., retracts) the objective lens 23 quickly. This retraction is made to prevent the objective lens 23 from colliding against the optical disk 1 with the disk flutter.

Next, the system controller issues a focus re-finding instruction f4 as shown in portion (f) of FIG. 12. In response to this focus re-finding instruction f4, the ramp signal generator 50 outputs a drive signal (i.e., the ramp signal a1) to move the objective lens 23 toward the optical disk 1 at a high velocity. In accordance with the magnitude of this ramp signal a1, the actuator driver 21 drives the actuator 22, which moves the objective lens 23 toward the optical disk 1 at a high velocity.

On sensing that the magnitude of the drive signal (i.e., ramp signal) a1, which is the output signal of the ramp signal generator 50, has become equal to the value associated with the velocity switching point that has been defined in advance, the velocity switching point detector 41 outputs the velocity switching signal e. In response to this velocity switching signal e, the ramp signal generator 50 changes the rates of increase of the ramp signal a1 so as to switch the moving velocities of the objective lens 23 into a lower velocity. As a result, the moving velocity of the objective lens 23 decreases as shown in portion (a) of FIG. 12.

Thereafter, when the focal point of the light beam approaches the information storage layer 1A of the optical disk 1, the in-focus state detector 32 tries detecting the in-focus state by reference to the focus error signal b and the reflected light intensity signal c. And when the in-focus state detector 32 detects the in-focus state, the controller 20 generates the control signal a2 and the switching circuit 31 sends the control signal a2 to the actuator driver 21.

The optical disk drive of the second preferred embodiment described above moves the objective lens 23 up and down a number of times while turning the optical disk 1 and selects the lowest focus position as the disk position. In that case, however, the disk position may not represent the maximum disk flutter of the optical disk 1 depending on exactly when the focal point crosses the information storage layer 1A. On the other hand, according to this preferred embodiment, the disk position is detected when the in-focus state is established with respect to the information storage layer 1A of the rotating optical disk 1. As a result, the position can be detected more accurately. In addition, since the velocity switching point can be determined based on the actual amplitude of the disk flutter, the velocity switching point can be brought even closer to the surface of the optical disk and the focus finding operation can get done in an even shorter time. In this preferred embodiment, the velocity switching point is set lower than the disk position by a distance D', which corresponds to the actual amplitude of disk flutter and which is normally much smaller than the maximum allowable amplitude of disk flutter as defined by the standard.

In the first through fourth preferred embodiments of the present invention described above, the optical disk 1 is supposed to have a single information storage layer 1A. However, the optical disk 1 may include a number of information storage layers that are stacked on upon the other. In performing a read/write operation on such a multilayer optical disk, the focal point of the light beam may need to be moved from one of those information storage layers to another. Such a move of the focal point is sometimes called a "focus jump", which does not involve the operation of retracting the objective lens as shown in FIGS. 8 and 9, though. Thus, in performing a "focus jump" operation, the objective lens has already come sufficiently close to the optical disk and there is no need to move the objective lens at a high velocity anymore.

Embodiment 5

Hereinafter, a fifth preferred embodiment of an optical disk drive according to the present invention will be described with reference to FIGS. 13, 14 and 15.

The optical disk drive of this preferred embodiment can also deal with a hybrid optical disk unlike the counterpart of any of the preferred embodiments described above and yet has the same basic configuration as that shown in FIG. 5.

A hybrid optical disk has a number of information storage layers that are located at mutually different depths as measured from the surface of the optical disk on which the incoming light is incident (which will be referred to herein as a "light-entering surface"). FIG. 13 is a cross-sectional view illustrating a hybrid optical disk that can be read from and written to by the optical disk drive of this preferred embodiment. The optical disk 200 shown in FIG. 13 includes a DVD storage layer 1A functioning as a first information storage layer and a BD storage layer 1B functioning as a second information storage layer. The DVD storage layer 1A is located at a depth of about 0.6 mm as measured from the light entering surface 200a, while the BD storage layer 1B is located at a depth of about 0.1 mm as measured from the light entering surface 200a. A read/write operation may be performed on the DVD storage layer 1A and the BD storage layer 1B by using an optical system for DVDs and an optical system for BDs, respectively. In either case, the read/write operation may be carried out by irradiating the optical disk 200 with a light beam through the same light-entering surface 200a. Such a hybrid optical disk 200 may be read from, and written to, by both a DVD-dedicated optical disk drive and a BD-dedicated optical disk drive alike.

The optical disk drive of this preferred embodiment can perform a read/write operation on any of these two storage layers 1A and 1B of the hybrid optical disk 200. This preferred embodiment is characterized by setting the velocity switching point to perform a focus finding operation on the DVD storage layer 1A with respect to the disk position that has been detected for the BD storage layer 1B, for example.

As described above, when a read/write operation is performed on the DVD storage layer 1A, a different optical system needs to be used from the situation where a read/write operation is performed on the BD storage layer 1B. Specifically, one of two different objective lenses and one of two different light sources are used selectively for that purpose. The objective lens for use to perform a read/write operation on the DVD storage layer 1A and the objective lens for use to perform a read/write operation on the BD storage layer 1B have mutually different working distances and focal lengths. That is why the velocity switching points of the objective lens needs to be changed depending on whether the target of the focus finding operation is the DVD storage layer 1A or the BD storage layer 1B.

These objective lenses may be driven separately by the actuator. However, to minimize the size of the optical pickup, those objective lenses are preferably driven all together. Thus, for this preferred embodiment, it will be described how to perform a focus finding operation by using a lens unit in which multiple objective lenses are assembled together.

First, a lens unit for use in this preferred embodiment will be described with reference to FIG. 14.

FIG. 14 illustrates a lens unit 302 on which an objective lens 300 for DVDs (which will be referred to herein as a "DVD objective lens") and an objective lens 301 for BDs (which will be referred to herein as a "BD objective lens") are held together. In this lens unit 302, the BD objective lens 301 is arranged closer to the optical disk 200 by a distance X than the DVD objective lens 300 is. The working distances of the DVD objective lens 300 and the BD objective lens 301 are identified by W1 and W2, respectively.

Portion (a) of FIG. 14 shows how a light beam (e.g., a red laser beam with a wavelength of 660 nm) is converged on the DVD storage layer 1A of the hybrid optical disk 200. On the other hand, portion (b) of FIG. 14 shows how a light beam (e.g., a violet laser beam with a wavelength of 405 nm) is converged on the BD storage layer 1B of the hybrid optical disk 200. Since the depths of the storage layers 1A and 1B as measured from the disk surface and the focal lengths are different from each other, the distance from the objective lens 300 or 301 to the optical disk 200 during a read/write operation varies depending on whether the target of the read/write operation is the storage layer 1A or the storage layer 1B.

For that reason, depending on whether the focal point of the light beam should be located on the storage layer 1A or on the storage layer 1B, the position of the lens unit 302 (i.e., the positions of the objective lenses in the optical axis direction) usually needs to be changed.

More exactly, if the lens unit 302 shown in FIG. 14 is used, the position of the lens unit 302 shown in portion (b) of FIG. 14 is closer to the optical disk 200 by a distance of (W1−W2−X) than that of the lens unit 302 shown in portion (a) of FIG. 14. That is to say, the state shown in portion (b) of FIG. 14 is realized by supplying a ramp signal a1 of greater magnitude to the actuator driver 21 (see FIG. 5, for example) than in the state shown in portion (a) of FIG. 14.

With such a lens unit 302, if the disk position is detected to perform a read/write operation on the BD storage layer 1B, for example, the velocity switching point will be able to be determined with respect to the disk position that has been detected in advance when a focus finding operation is carried out after that to perform a read/write operation on the DVD storage layer 1A. Hereinafter, a method of determining the velocity switching point according to this preferred embodiment will be described.

Suppose a disk position associated with the BD storage layer 1B of the optical disk 200 has been detected by the method of any of the preferred embodiments of the present invention described above. This disk position is supposed to be represented by the magnitude A1 of the ramp signal a1 in the state shown in portion (b) of FIG. 14 (see FIG. 6). Then, the velocity switching point for performing a focus finding operation on the BD storage layer 1B is figured out by subtracting a predetermined quantity of 2D, for example (where D is the amplitude of the disk flutter) from the disk position. As a result, the magnitude A2 of the ramp signal a1 can be associated with the velocity switching point as shown in FIG. 6, for example. In this case, the difference in the magnitude of the ramp signal a1 (i.e., A1−A2) corresponds to the distance of 2D, for example, from the disk position to the velocity switching point.

According to this preferred embodiment, the velocity switching point for the DVD storage layer 1A is calculated in the following manner based on the disk position or the velocity switching point that has been defined as described above for the BD storage layer 1B.

First, as is clear from the foregoing description, the position of the lens unit 302 shown in portion (a) of FIG. 14 is farther away from the optical disk 200 by a distance of (W1−W2−X) than that of the lens unit 302 shown in portion (b) of FIG. 14. Therefore, once the disk position for the BD storage layer 1B is known, the disk position for the DVD storage layer 1A can also be figured out. Supposing the magnitude of the ramp signal a1 corresponding to the distance (W1−W2−X) is identified by $\Delta_{DVD-BD}$, the disk position for the DVD storage layer 1A can be defined by subtracting $\Delta_{DVD-BD}$ from the magnitude A1 of the ramp signal a1 representing the disk position for the BD storage layer 1B. That is to say, the disk position for the DVD storage layer 1A is represented by the ramp signal a1, of which the magnitude is A1−$\Delta_{DVD-BD}$.

After that, by subtracting A1−$\Delta_{DVD-BD}$ from the magnitude (A1−A2) of the ramp signal a1 corresponding to 2D (where D is the amplitude of the disk flutter), the magnitude of the ramp signal a1 corresponding to the velocity switching point can be obtained.

As described above, according to this preferred embodiment, by performing simple calculations on a disk position or a velocity switching point that has been figured out for one storage layer of a hybrid optical disk, a disk position or a velocity switching point for another storage layer thereof can be obtained. Consequently, when a read/write operation is carried out on multiple different storage layers of a hybrid optical disk, the focus finding operation can get done in a shorter time.

It should be noted that the optical disk drive of any of the first through fourth preferred embodiments described above could also include the lens unit 302 shown in FIG. 14. In the optical disk drives of the first through fourth preferred embodiments, however, when the targets of a read/write operation are changed from a BD into a DVD, for example, the optical disks themselves need to be changed from a BD into a DVD. Thus, the disk position also needs to be detected for the DVD that has been newly loaded.

Meanwhile, the optical disk drive of this preferred embodiment can switch the targets of the read/write operation between the BD storage layer 1B and the DVD storage layer 1A of a single hybrid optical disk 200. Hereinafter, this operation will be described in detail with reference to FIG. 15.

In FIG. 15, portion (a) shows where the focus position of the light beam passes with time, portion (b) shows the waveform of the focus error signal, portion (c) shows the waveform of the output signal of the reflected light intensity detector (i.e., the reflected light intensity signal), portion (d) shows the output times of an in-focus state detection signal, portion (e) shows the velocity switching points of the objective lenses (or the lens unit 302), and portion (f) shows the times when the system controller issues various instructions.

First, when the hybrid optical disk 200 is loaded into the optical disk drive of this preferred embodiment, the disk position is detected in the procedure that has already been described with reference to FIG. 8, and the velocity switching point setting section 70 shown in FIG. 7 sets the velocity switching point with respect to the disk position as described above. In this example, the disk position is supposed to be detected using a BD light beam first. The optical disk drive of this preferred embodiment is supposed to include the lens unit 302 shown in FIG. 14.

Next, the system controller 30 outputs the optical disk rotation instruction f2 shown in portion (f) of FIG. 15. In response to this disk rotation instruction f2, the optical disk motor 24 starts to rotate the hybrid optical disk 200 at a predetermined rotational velocity.

Thereafter, the system controller 30 issues a focus finding instruction (BD) as shown in portion (f) of FIG. 15. In response to this focus finding instruction (BD), the ramp signal generator 50 outputs a drive signal to move the lens unit 302 toward the hybrid optical disk 200 at a high velocity. In accordance with this drive signal, the actuator driver 21 starts to drive the actuator 22, which moves the lens unit 302 toward the hybrid optical disk 200 at a high velocity.

On sensing that the magnitude of the ramp signal a1, which is the output signal of the ramp signal generator 50, has become equal to the value A2 associated with the velocity switching point that has been defined in advance, the velocity switching point detector 41 outputs the velocity switching signal e. In response to this velocity switching signal e, the ramp signal generator 50 changes the ramp signal a1 so as to switch the moving velocities of the lens unit 302 into a lower velocity. As a result, the moving velocity of the lens unit 302 decreases as shown in portion (a) of FIG. 15.

Thereafter, when the focal point of the BD light beam approaches the information storage layer 1B of the hybrid optical disk 200 sufficiently, the in-focus state detector 32 tries detecting the in-focus state by reference to the focus error signal b and the reflected light intensity signal c. And when the in-focus state detector 32 detects the in-focus state, the controller 20 generates a control signal based on the focus error signal b and the switching circuit 31 sends the control signal to the actuator driver 21. In this manner, a focus finding operation on the BD storage layer 1B is finished. Thereafter, a read/write operation is performed on the BD storage layer 1B.

Next, it will be described how to change the targets of a read/write operation from the BD storage layer 1B to the DVD storage layer 1A. To do so, first, the focus servo control is once stopped. Then, the lens unit 302 gets temporarily lowered by the actuator driver 21 and the actuator 22. In portion (a) of FIG. 15, only the trace of the focus position of the light beam is shown and that of the lens unit 302 is not shown for the sake of simplicity. Even if the lens unit 302 remains at the same position, the focus position of the light beam changes discontinuously when a light source and an objective lens for BDs are changed into those for DVDs.

To perform a read/write operation on the DVD storage layer 1A, the light sources need to be changed from a laser diode for BDs into a laser diode for DVDs. When the system controller 30 issues the laser change instruction shown in portion (f) of FIG. 15, the BD light beam stops being radiated but the DVD light beam starts being radiated instead. As described above, even if the lens unit 302 remains at the same position, the objective lenses to use are changed when the light sources are changed. As a result, the focus position of the light beam changes, too. As shown in FIG. 13, the focal length of the DVD objective lens 300 is greater than that of the BD objective lens 301. That is why even if the lens unit 302 has once been retracted downward and has not started to move yet, the focus position of the light beam moves toward the DVD storage layer 1A when the light sources are changed as shown in portion (a) of FIG. 15.

Next, to perform a focus finding operation on the DVD storage layer 1A, the lens unit 302 is moved toward the hybrid optical disk 200. In this case, since the disk position has already been detected, there is no need to detect the disk position again. The velocity switching point to perform the focus finding operation on the DVD storage layer 1A is determined with respect to this disk position by the method described above. As this velocity switching point, the value that has been calculated by the velocity switching point detector 41 and stored in the velocity switching point setting section 70 shown in FIG. 7 is used.

Next, the focus finding operation on the DVD storage layer 1A is carried out just like the focus finding operation on the BD storage layer 1B. Specifically, the system controller 30 issues a focus finding instruction (DVD) as shown in portion (f) of FIG. 15. In response to this focus finding instruction (DVD), the ramp signal generator 50 outputs a drive signal to move the lens unit 302 toward the hybrid optical disk 200 at a high velocity. In accordance with this drive signal, the actuator driver 21 starts to drive the actuator 22, which moves the lens unit 302 toward the hybrid optical disk 200 at a high velocity.

On sensing that the magnitude of the ramp signal a1, which is the output signal of the ramp signal generator 50, has become equal to the value associated with the velocity switching point for the DVD storage layer 1A, the velocity switching point detector 41 outputs the velocity switching signal e. In response to this velocity switching signal e, the ramp signal generator 50 changes the ramp signal a1 so as to switch the moving velocities of the lens unit 302 into a lower velocity. As a result, the moving velocity of the lens unit 302 decreases as shown in portion (a) of FIG. 15.

Thereafter, when the focal point of the DVD light beam approaches the DVD storage layer 1A of the hybrid optical disk 200 sufficiently, the in-focus state detector 32 tries detecting the in-focus state by reference to the focus error signal b and the reflected light intensity signal c. And on detecting the in-focus state, the in-focus state detector 32 sends a switching control signal d to the switching circuit 31. In response to this control signal d, the switching circuit 31 starts sending the control signal a2 supplied from the controller 20 to the actuator driver 21 instead of the ramp signal a1 that has been supplied from the ramp signal generator 50. In this manner, the focus finding operation on the DVD storage layer 1A is finished. Thereafter, a read/write operation is performed on the DVD storage layer 1A.

As described above, according to this preferred embodiment, by utilizing the disk position information that has been acquired in advance on the hybrid optical disk 200 loaded in the optical disk drive, the velocities are switched to carry out the focus finding operations on the respective information storage layers. Thus, there is no need to perform the same disk position detection operation all over again and the time it takes to perform read/write operations on the hybrid optical disk 200 can be shortened.

In the example described above, a read/write operation is performed on the BD storage layer first, and then a read/write operation is performed on the DVD storage layer. However, the optical disk drive of the present invention does not have to work that way. Even if a read/write operation is performed on the BD storage layer after a read/write operation has been performed on the DVD storage layer, the velocity switching points to carry out the focus finding operations on the respective storage layers can also be defined by reference to the disk position information that has been acquired first.

The hybrid optical disk described above includes a DVD storage layer and a BD storage layer. However, a hybrid optical disk including any other combination of storage layers of multiple types may be used instead.

Embodiment 6

The optical disk drive of the fifth preferred embodiment separately performs the disk position detection operation before the focus finding operation just like the counterpart of the first preferred embodiment described above. However, the present invention is in no way limited to those specific preferred embodiments. Alternatively, the disk position may also be detected based on the disk flutter of the optical disk 200 while a read/write operation is being carried out on the BD storage layer 1B as in the optical disk drive of the fourth preferred embodiment. The optical disk drive of this preferred embodiment detects the disk position while performing a read/write operation on an information storage layer of a hybrid optical disk. Then, by reference to the disk position detected, the optical disk drive defines a velocity switching point to perform a focus finding operation on another information storage layer.

Hereinafter, it will be described with reference to FIG. 16 how the optical disk drive of this preferred embodiment operates. FIG. 16 is almost the same drawing as FIG. 15 except that the period in which a read/write operation is being performed on the BD storage layer 1B is shown on a larger scale in FIG. 16.

The optical disk drive of this preferred embodiment has the same configuration as the counterpart shown in FIG. 11. That is to say, the optical disk drive of this preferred embodiment also includes a low pass filter (LPF) 80 for generating a signal by filtering out high-frequency components from the output of the controller 20 and then inputting the signal to the disk position detector 40 as shown in FIG. 11.

The disk position detector 40 of this preferred embodiment detects the disk position based on the output of the LPF 80 and defines the velocity switching point by reference to the disk position just as already described for the fourth preferred embodiment. Thus, the description thereof will be omitted herein. It should be noted that the optical disk drive of this preferred embodiment is supposed to include the lens unit 302 shown in FIG. 16 just like the fifth preferred embodiment described above.

As in the fifth preferred embodiment described above, the targets of read/write operations are also changed from the BD storage layer 1B into the DVD storage layer 1A in this preferred embodiment, too. Also, as in the fourth preferred embodiment, the disk position is detected based on the minimum value of the LPF output to be obtained while a read/write operation is being carried out on the BD storage layer 1B as shown in portion (a) of FIG. 16. Information about the velocity switching point that has been defined by reference to this disk position is stored in the velocity switching point setting section 70 shown in FIG. 7.

If the targets of read/write operations are changed from the BD storage layer 1B into the DVD storage layer 1A, when the system controller 30 issues a "focus OFF (BD)" instruction as shown in portion (f) of FIG. 16, the focus servo control is once stopped. Then, the actuator driver 21 and the actuator 22 work together to temporarily retract the lens unit 302 downward.

Thereafter, a focus finding operation is carried out on the DVD storage layer 1A in the same procedure as that already described for the fifth preferred embodiment.

As described above, according to this preferred embodiment, if a hybrid optical disk has been loaded into an optical disk drive, velocities can be switched, by reference to the disk position information that has been acquired while a read/write operation is being performed on one information storage layer thereof, to start a focus finding operation on another information storage layer thereof. Thus, there is no need to perform the same disk position detection operation all over again and the time it takes to perform read/write operations on the hybrid optical disk 200 can be shortened. In addition, according to this preferred embodiment, the disk position detection operation does not have to be performed in advance and the disk position can be detected based on the actual amplitude of disk flutter of the optical disk. As a result, the velocities can be switched even more efficiently and the focus finding operation can be further shortened.

In the preferred embodiments described above, the lens position changes linearly with time as shown in portion (a) of FIG. 8 and portion (a) of FIG. 9. Actually, however, the lens position does not have to change linearly but may change curvilinearly at least partially with time.

Also, in the preferred embodiments described above, the velocities of the objective lens are changed from a "high" velocity into a "low" velocity. It should be noted that the velocities are rated herein as relative values. In a preferred embodiment, the "low" velocity may be 10-20% of the "high" velocity, for example.

According to the present invention, even when an optical system with a high NA is adopted to realize high-density storage, the focus finding operation can also get done in a shorter time effectively, thus providing an optical disk drive that can easily perform a read/write operation on a next-generation optical disk with high storage density.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2005-223178 filed on Aug. 1, 2005 and No. 2006-199359 filed on Jul. 21, 2006, the entire contents of which are hereby incorporated by reference.

What is claimed is:

1. An optical disk drive comprising:
an objective lens for converging a light beam onto an optical disk that includes an information storage layer, the optical disk having a blue laser format;
an optical disk motor for rotating the optical disk;
an actuator for moving the objective lens perpendicularly to the information storage layer of the optical disk;
an actuator driving section for moving the objective lens at a predetermined velocity by controlling the operation of the actuator;
disk position detecting means for detecting a position of the objective lens, when the focal point of the light beam is located right on the information storage layer of the optical disk, as a disk position; and
moving velocity setting means for setting a moving velocity of the objective lens to a first value until the objective lens reaches a velocity switching point, which is determined by reference to the disk position, while the objective lens is being moved toward the optical disk to carry out a focus finding operation and for setting the moving velocity of the objective lens to a second value that is lower than the first value once the objective lens has passed the velocity switching point, wherein before the focus finding operation is started, the disk position detecting means gets the objective lens moved perpendicularly to the information storage layer of the optical disk by the actuator, thereby determining the disk position, and wherein the velocity switching point is determined before the focus finding operation is started, and set farther away from the optical disk than the disk position, and wherein the optical disk is not being rotated by the optical disk motor while the disk position detecting means detects the disk position.

2. The optical disk drive of claim 1, wherein the moving velocity setting means includes:
a drive signal generator for generating a drive signal to drive the actuator; and
velocity switching point detecting means for giving the drive signal generator an instruction to change the moving velocities when sensing that the objective lens is located at the velocity switching point.

3. The optical disk drive of claim 2, further comprising: focus error detecting means for generating a focus error signal representing the magnitude of shift of the focal point of the light beam from the information storage layer of the optical disk; and
in-focus state detecting means for seeing, by reference to the focus error signal, if the focal point of the light beam is located right on the information storage layer of the optical disk,
wherein based on the drive signal to drive the actuator and on an output of the in-focus state detecting means, the disk position detecting means defines a value of the drive signal, which is associated with the disk position, as disk position information.

4. The optical disk drive of claim 3, wherein while the objective lens is being moved toward the optical disk to carry out the focus finding operation, the velocity switching point detecting means senses, by reference to the drive signal to drive the actuator and the disk position information, if the objective lens has reached the velocity switching point.

5. The optical disk drive of claim 3, further comprising reflected light intensity detecting means for outputting a reflected light intensity signal representing the intensity of light that has been reflected from the optical disk,
wherein by reference to the focus error signal and the reflected light intensity signal, the in-focus state detecting means senses if the focal point of the light beam is located on the information storage layer of the optical disk.

6. The optical disk drive of claim 1, wherein the disk position is set a number of times with the optical disk rotated, and
wherein a position of the objective lens, which is farther away from the optical disk than any other position of the objective lens when the focal point of the light beam is located on the information storage layer of the optical disk, is selected as the disk position.

7. The optical disk drive of claim 1, further comprising a memory for storing information about the disk position or the velocity switching point.

8. The optical disk drive of claim 1,
wherein when the focus finding operation is started over after the light beam has once been out of focus with the optical disk, the moving velocity setting means changes the moving velocity of the objective lens at the velocity switching point that has been set by reference to the disk position detected.

9. The optical disk drive of claim 8, wherein the disk position detecting means sets the velocity switching point for a next focus finding operation by reference to the position of the objective lens when the focal point of the light beam is located on the information storage layer of the optical disk and before the light beam comes out of focus with the optical disk.

10. The optical disk drive of claim 9, further comprising:
focus error detecting means for generating a focus error signal representing the magnitude of shift of the focal point of the light beam from the information storage layer of the optical disk; and
in-focus state detecting means for seeing, by reference to the focus error signal, if the focal point of the light beam is located right on the information storage layer of the optical disk,
wherein based on the drive signal to drive the actuator and on an output of the in-focus state detecting means, the disk position detecting means defines a value of a drive signal, which is associated with the disk position, as disk position information.

11. The optical disk drive of claim 10, further comprising a low pass filter for filtering out high frequency components from the drive signal,
wherein based on the drive signal, of which the high frequency components have been filtered out, and the output of the in-focus state detecting means, the disk position detecting means defines disk position information.

12. The optical disk drive of claim 11, wherein the velocity switching point when the focus finding operation is started over is closer to the optical disk than the velocity switching point was when the focus finding operation was performed for the first time.

13. The optical disk drive of claim 8, wherein before the focus finding operation is started for the first time, the disk position detecting means gets the objective lens moved perpendicularly to the information storage layer of the optical disk by the actuator, thereby setting the disk position.

14. The optical disk drive of claim 1, wherein the distance from the disk position to the velocity switching point is determined by an amplitude of disk flutter of the optical disk.

15. The optical disk drive of claim 14, wherein the amplitude of the disk flutter of the optical disk is defined by a standard for the optical disk.

16. A processor for use in an optical disk drive, the drive including:
an objective lens for converging a light beam onto an optical disk that includes an information storage layer, the optical disk having a blue laser format;
an optical disk motor for rotating the optical disk;
an actuator for moving the objective lens perpendicularly to the information storage layer of the optical disk; and
an actuator driving section for moving the objective lens at a predetermined velocity by controlling the operation of the actuator,
the processor comprising:
disk position detecting means for detecting a position of the objective lens, when the focal point of the light beam is located right on the information storage layer of the optical disk, as a disk position;
moving velocity setting means for setting a moving velocity of the objective lens to a first value until the objective lens reaches a velocity switching point, which is determined by reference to the disk position, while the objective lens is being moved toward the optical disk to carry out a focus finding operation and for setting the moving velocity of the objective lens to a second value that is lower than the first value once the objective lens has passed the velocity switching point, wherein before the focus finding operation is started, the disk position detecting means gets the objective lens moved perpendicularly to the information storage layer of the optical disk by the actuator, thereby determining the disk position, and wherein the velocity switching point is determined before the focus finding operation is started, and set farther away from the optical disk than the disk position, and wherein the optical disk is not being rotated by the optical disk motor while the disk position detecting means detects the disk position.

17. The processor of claim 16, wherein the distance from the disk position to the velocity switching point is determined by an amplitude of disk flutter of the optical disk.

18. A method for driving an optical disk drive, the drive including: converging and irradiating means for converging a light beam onto an optical disk, the optical disk having a blue laser format including an information storage layer, through an objective lens and irradiating the disk with the light beam; an optical disk motor for rotating the optical disk; an actuator for moving the objective lens perpendicularly to the information storage layer of the optical disk; and an actuator driving section for moving the objective lens at a predetermined velocity by controlling the operation of the actuator, the method comprising the steps of:

(A) detecting a position of the objective lens, when the focal point of the light beam is located right on the information storage layer of the optical disk, as a disk position;

(B) setting a velocity switching point, where a moving velocity of the objective lens is changed, farther away from the optical disk than the disk position; and (C) after the step (B), moving the objective lens toward the optical disk to carry out a focus finding operation, wherein the step (C) includes setting the moving velocity of the objective lens to a first value until the objective lens reaches the velocity switching point and setting the moving velocity of the objective lens to a second value that is lower than the first value once the objective lens has passed the velocity switching point, and wherein in the step (A), the optical disk is not being rotated by the optical disk motor while the disk position is detected.

19. The method of claim 18, wherein, in the step (B), the distance from the disk position to the velocity switching point is determined by an amplitude of disk flutter of the optical disk.

20. An optical disk drive comprising:

an objective lens unit for converging a first light beam with a first wavelength onto a first information storage layer of an optical disk, which includes a plurality of information storage layers including the first information storage layer and a second information storage layer, and for converging a second light beam with a second wavelength onto the second information storage layer;

an actuator for moving the objective lens unit perpendicularly to the information storage layers of the optical disk;

an actuator driving section for moving the objective lens unit at a predetermined velocity by controlling the operation of the actuator;

disk position detecting means for detecting a position of the objective lens unit, when the focal point of the first light beam is located right on the first information storage layer of the optical disk, as a disk position; and moving velocity setting means for setting a moving velocity of the objective lens unit to a first value until the objective lens unit reaches a first velocity switching point, which is determined by reference to the disk position, while the objective lens unit is being moved toward the optical disk to carry out a focus finding operation on the first information storage layer using the first light beam and for setting the moving velocity of the objective lens unit to a second value that is lower than the first value once the objective lens unit has passed the first velocity switching point, wherein the moving velocity setting means sets a moving velocity of the objective lens unit to a third value until the objective lens unit reaches a second velocity switching point, which is determined by reference to the disk position, while the objective lens unit is being moved toward the optical disk to carry out a focus finding operation on the second information storage layer using the second light beam and sets the moving velocity of the objective lens unit to a fourth value that is lower than the third value once the objective lens unit has passed the second velocity switching point, wherein the first and second velocity switching points are set farther away from the optical disk than the disk position, and wherein before the focus finding operation is performed on the first information storage layer using the first light beam, the disk position detecting means gets the objective lens unit moved perpendicularly to the first information storage layer by the actuator, thereby setting the disk position.

\* \* \* \* \*